United States Patent
Partain et al.

(10) Patent No.: US 7,423,253 B2
(45) Date of Patent: Sep. 9, 2008

(54) METHOD AND APPARATUS FOR CORRECTING EXCESS SIGNALS IN AN IMAGING SYSTEM

(75) Inventors: Larry D. Partain, San Mateo, CA (US); Ivan Mollov, Cupertino, CA (US); Carlo Tognina, Stanford, CA (US); Richard E. Colbeth, Los Altos, CA (US)

(73) Assignee: Varian Medical Systems Technologies, Inc., Palo Alto, CA (US)

( * ) Notice: Subject to any disclaimer, the term of this patent is extended or adjusted under 35 U.S.C. 154(b) by 0 days.

(21) Appl. No.: 11/729,611

(22) Filed: Mar. 29, 2007

(65) Prior Publication Data

US 2007/0170351 A1 Jul. 26, 2007

Related U.S. Application Data

(63) Continuation of application No. 10/688,484, filed on Oct. 16, 2003, now Pat. No. 7,208,717.

(60) Provisional application No. 60/419,132, filed on Oct. 16, 2002.

(51) Int. Cl.
*H05G 1/64* (2006.01)

(52) U.S. Cl. .............. 250/214 C; 250/370.09; 378/98.11

(58) Field of Classification Search ............ 250/370.09, 250/370.11, 458.1, 459.1, 208.1, 370.03, 250/214 C; 378/9, 11, 19, 62, 98.2, 98.8; 382/274

See application file for complete search history.

(56) References Cited

U.S. PATENT DOCUMENTS

| | | | |
|---|---|---|---|
| 5,452,338 | A | 9/1995 | Granfors et al. |
| 6,222,901 | B1 | 4/2001 | Meulenbrugge et al. |
| 6,353,654 | B1 | 3/2002 | Granfors et al. |
| 6,996,288 | B2 | 2/2006 | Sun |
| 2001/0008271 | A1 | 7/2001 | Ikeda et al. |

OTHER PUBLICATIONS

Sussan Pourjavid et al. "Compensation for Image Retention in an Amorphous Silicon Detector", SPIE Conference on Physics of Medical Imaging, Feb. 1999, vol. 3659, p. 501-509.

P.A. Iles and Y.C.M. Yeh, "Silicon, Gallium Arsenide, and Indium Phosphide Cells: Single Junction, One Sun Space", Solar Cells and Their Applications, ISBN 0-471-57420-1, 1995, pp. 99-123.

A. Catalano, "a Si:H-Based Solar Cells", Solar Cells and Their Applications, ISBN 0-471-57420-1, 1995, pp. 163-184.

H.C. Slade et al. "Below Threshold Conduction in a-Si:H Thin Film Transistors With and Without a Silicon Nitride Passivating Layer", Appl. Phys. Lett. 69 (17), Oct. 21, 1996, pp. 2560-2562.

John A. Rowlands, "Flat Panel Detectors for Digital Radiography", "Handbook of Medical Imaging", Jacob Beutel et al. vol. 1, Physics and Psychophysics, 2000, SPIE—The Society of Photo-Optical Instrumentation Engineers, pp. 223-328.

*Primary Examiner*—Georgia Y. Epps
*Assistant Examiner*—Tony Ko
(74) *Attorney, Agent, or Firm*—Blakely, Sokoloff, Taylor & Zafman LLP

(57) ABSTRACT

A method and apparatus for excess signal compensation in an imaging system is described. In one particular embodiment, the invention provides for non-linear background, offset (due to time dependent dark current) and/or lag (including constant, linear and non-linear terms, due to image persistence) corrections of large area, flat panel imaging sensors.

20 Claims, 16 Drawing Sheets

$$I_E(t) = \frac{K}{t}, \quad Q_E(t) = \int_{t}^{t+T_i} I_E(t)\, dt$$

INTEGRATION TIME $$\text{INTEGRATION TIME Ti} = \frac{1}{\text{FRAME RATE}}$$

| FRAME RATE (FPS) | INTEGRATION TIME (SEC) |
|---|---|
| 0.1 | 10 |
| 1 | 1 |
| 30 | 0.033 |
| 100 | 0.01 |

UNCOMPENSATED
FRAME F   1000

COMPENSATED
FRAME F   1010

UNCOMPENSATION FRAME
G1100

COMPENSATED FRAME
G1110

| | FRAME # 1510 | | | |
|---|---|---|---|---|
| | $F_i$ | $F_{i+1}$ | ... | $F_K$ |
| $F_{Cj}$ | $F_{EC}(i,j)$ | $F_{EC}(i+1,j)$ | ... | $F_{EC}(k,j)$ |
| $F_{Cj+1}$ | $F_{EC}(i,j+1)$ | ⋮ | ... PRE-CALCULATED EXCESS SIGNAL 1530 | |
| | ⋮ | ⋮ | | |
| $F_{CL}$ | $F_{EC}(i,L)$ | | | $F_{EC}(K,L)$ |

REFERENCE IMAGE FRAME SIGNAL 1520

METHOD AND APPARATUS FOR CORRECTING EXCESS SIGNALS IN AN IMAGING SYSTEM

RELATED APPLICATION

This application is a continuation of U.S. patent application Ser. No. 10/688,484 filed Oct. 16, 2003 now U.S. Pat. No. 7,208,717 which claims the benefit of U.S. Provisional Patent Application No. 60/419,132, filed Oct. 16, 2002.

TECHNICAL FIELD

This invention relates generally to large area, flat panel imagers. More specifically, the invention relates to amorphous silicon and/or organic semiconductor thin-film-transistor (TFT) or diode-switched array imagers.

BACKGROUND

Large area flat panel imagers function by accumulating charge on capacitors generated by pixels of p-i-n photodiodes (amorphous silicon or organic semiconductor) with scintillators or by pixels of photoconductors. Typically, many pixels are arranged over a surface of the imager where TFTs (or single and/or double diodes) at each pixel connect the charged capacitor to a read out amplifier at the appropriate time. A pixel is composed of the scintillator/photodiode/capacitor/TFT or switching-diode combination or by the photoconductor/capacitor/TFF or switching-diode combination. Often the photodiode intrinsically has enough capacitance that no separate charge storage capacitor is required. As illustrated in FIG. 1A, radiation (e.g., alpha, beta, gamma, X-ray, neutrons, protons, heavy ions, etc.) strikes the scintillator and causes the scintillator to generate visible light. The visible light strikes a photodiode and generates an electric current. Alternatively, an imager may be configured such that the radiation strikes a biased photoconductor to generate the electric current, as illustrated in FIG. 1B. The current charges a capacitor (where the illustrated capacitor includes the self capacitance of the photoconductor) and leaves a charge on the capacitor. The integrated charge on the capacitor is proportional to the integrated light intensity striking the respective photoconductor for a given integration time. At an appropriate time, a switch (e.g., a TFT or switching diode(s)) activates and reads out the charge from the capacitor onto a charge sensitive amplifier (not shown).

For long integration times, typically over 20 seconds for amorphous silicon technology, there is a linear increase in charge $Q_{Li}$ to the capacitor charge (in coulombs) of pixel "i," as a function of discrete frame time T, due to a constant leakage (or dark) current from the switch (e.g., TFT), diode or photodetector. This dark current $I_D$ is on the order of 1-2 femtoamps (fA) for 100 to 200 micron wide pixels of amorphous silicon TFT construction. The expression for $Q_{Li}$ is the dark current $I_D$ multiplied by T. Dark current $I_D$ may be constant or time varying; giving an excess charge $Q_E$ contribution that is either linear or non-linear with respect to time, respectively. This linear dark charge contribution to $Q_{Li}$ is subtracted from the total charge $Q_{Ti}$ read off the capacitor of pixel "i" in order to provide the true image charge $Q_{Si}$. Subtracting the dark-current charge contribution (either linear or non linear), from the total charge $Q_{Ti}$ read off the capacitor, is called background (or offset) correction.

In addition to dark current charge contributions from the switch (e.g., TFT) there are leakage (or dark) current charge contributions from the capacitor and the photodiode. The true image charge $Q_{Si}$ is obtained by subtracting the background (or offset) dark charge contributions from the measured charge $Q_{Ti}$ of pixel "i." The simplest background correction method is to subtract a constant fraction of the charge that was present on pixel "i" during at least one, and sometimes additional, prior frames.

Prior background correction methods have been implemented to estimate offset correction. One prior background correction method discussed in U.S. Pat. No. 5,452,338, isolates the offset image by acquiring an image when the detector is not exposed to X-rays, using the same timing used in acquiring the X-ray exposed images. The image acquired after exposure is then subtracted from future frames. One problem with the use of one single frame in determining the offset correction is the offset image introduces additional noise. To reduce the additional noise, multiple non-exposed images may be acquired and then averaged. One problem using a single image or an average of multiple images is the offset signals may drift with time, temperature, and other extrinsic factors while the single image or averaged image remains constant.

Another prior background correction method discussed in a paper by Sussan Pourjavid, et al., entitled "Compensation for Image Retention in an Amorphous Silicon Detector" (SPIE Conference on Physics of Medial Imaging, February 1999), and U.S. Pat. No. 5,452,338, continuously updates the offset images to compensate for drift in the offset signals. The method, described in the above references, models the time response of the background contribution from leakage current (or dark image) in the diodes as a linear time invariant system (LTI) using linear systems theory (least square method). The LTI system derived from the response model is then used to predict the offset needed for image correction. However, in modern medical imaging equipment, for example, there is a demand for real-time, 30 frames per second images, where scans are made with 33 millisecond integration times. Even more advanced imaging applications, like computed tomography, can use even higher frames rates of 120, 360 or even 900 frames per second, corresponding to respective integration times of 8, 3 and 1 milliseconds, respectively. Background correction using least square prediction of discrete frame time in such situations is not as effective. With near real-time imaging, for example 3 frames per second (FPS) or faster, background correction with least square prediction can introduce significant image errors and artifacts. A more effective method for background (or offset) correction is needed in short-integration-time imaging applications.

SUMMARY OF AN EMBODIMENT OF THE INVENTION

The present invention pertains to a method and apparatus for excess charge corrections in flat panel imaging sensors.

Additional features and advantages of the present invention will be apparent from the accompanying drawings, and from the detailed description that follows below.

BRIEF DESCRIPTION OF THE DRAWINGS

The present invention is illustrated by way of example and not intended to be limited by the figures of the accompanying drawings.

DETAILED DESCRIPTION

Figure 1A:
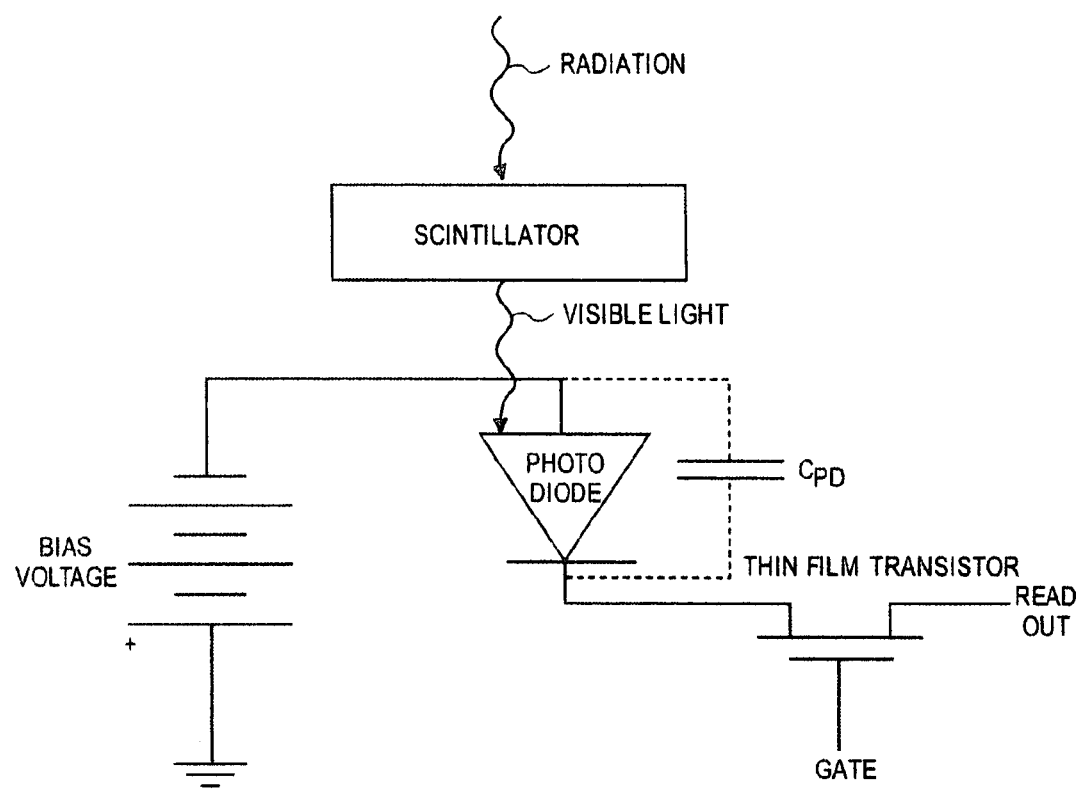
FIG. 1A is an illustration of conventional components of an imager sensor array.

In the following description, numerous specific details such as specific materials, processing parameters, processing steps, etc., are set forth in order to provide a thorough understanding of the invention. One skilled in the art will recognize that these details need not be specifically adhered to in order to practice the claimed invention. In other instances, well known processing steps, materials, etc., are not set forth in order not to obscure the invention.

Some portions of the description that follow are presented in terms of algorithms and symbolic representations of operations on data bits that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has been proven convenient at times, principally for reasons of common usage, to refer to these signals as bits, values, elements, symbols, characters, terms, numbers, parameters, or the like. The term "coupled" as used herein means coupled directly to, or indirectly through one or more intervening components. References to charge may be expressed in terms of current integrated over time. Current is the amount of electric charge flowing past a specified circuit point per unit time.

The invention provides a method and apparatus for correction of image artifacts in imaging sensors due to excess charge. Sources of excess charge may be contributed by, for examples, leakage currents, offset (due to time dependent dark current), and lag currents (including constant, linear and non-linear terms, due to image persistence). The dark current charge contributions may be introduced from the switch (e.g., TFT). The leakage (or dark) charge contributions may be introduced from the capacitor and the photodiode. There may be persistent or "lag" charge contributions (and pixel capacitor charge contributions) from the photoconductor/photodiode or from incomplete charge read out from the capacitor, in a given frame of prior frames subjected to high dose radiation exposure. This "lag" charge contribution can be either linear or non linear in a discrete frame time T. Lag charge contributions are particularly prevalent when one frame is bright and the next is dark.

For purposes of the discussion hereafter, the term signal refers to the digital output of an imager, for example, as may be generated at the output of A/D converters 17 discussed below in relation to FIG. 2A. The digital signal (e.g., $S_E$ 235) is generally proportional to the measured charged (e.g., $Q_E$ 35) on the output of the imager sensor array 16, as is known in the art.

In one embodiment, the method includes determining an integration time based on the frame rate of the images and calculating a non-linear background signal $S_{NLi}$ and/or prior-frames-dependent lag signal $S_{LAGi}$ per pixel "i." The lag signal $S_{LAGi}$ may be a constant fraction of the true image signal $S_{Si}$ of pixel "i," or a constant fraction of the measured signal $S_{Ti}$ of pixel "i," from one or more prior frames with appropriate weighting factors. In order to correct images, the method may include subtracting the lag signal $S_{LAGi}$ and the non-linear background signal $S_{NLi}$ from the measured signal $S_{Ti}$ representative of the charge on the capacitor of each pixel "i" for each image frame.

For faster than 0.1 frames per second, one method of generating the true image signal $S_{Si}$ of pixel "i," is to estimate the modeled (or theoretical or simulated), time-dependent, excess (e.g., leakage, dark, and lag) charge as a function of time from zero to an integration time. Another method of calculating true image signal $S_{Si}$ is to integrate a smooth curve fit of experimental data of the time dependent excess charge as a function of time. One value for the integration time is the reciprocal of the frame rate. The estimated excess current is composed of the non-linear background signal $S_{NLi}$ and/or of the calculated lag signal $S_{LAGi}$ is subtracted from a measured signal $S_{Ti}$ of a pixel "i" in order to produce the true image signal $S_{Si}$ of pixel "i," typically with frame rates faster than 0.1 frames per second.

In one embodiment, the method includes estimating the excess signal $S_E$ (representative of the excess charge $Q_E$) by using a reference image frame when the end of exposure time of a high-dose radiographic image is known. The method determines the difference between the frame time of the reference image frame and the end of exposure time of the high-dose radiographic image. In one embodiment, the excess signal may be estimated using a power function. The power function uses the measured signal $S_T$ (representative of a measured charge) of the reference image frame and the difference in time between the frame time of the reference image frame and the end of exposure time to determine a coefficient. The coefficient is then multiplied by a time-varying algebraic decay to estimate the excess signal $S_E$. The excess signal $S_E$ is the integral of the excess signal over the frame time. In another embodiment, the excess signal may be estimated using a look-up table. One example of using a look-up table may include indexing a pre-calculated excess signal $S_{PRE}$ to estimate the excess signal $S_E$ (representative of the excess charge $Q_E$) using a post exposure number of frames and measured signal $S_T$ of the reference image frame. The difference in time is then converted to a frame number based on the frame rate. Once the excess signal $S_E$ has been estimated using at least one of the power function and the look up table, the method may include subtracting the estimated excess signal $S_E$ from the measured signal $S_T$ for an image frame. Subtracting the estimated excess signal $S_E$ of the image frame may remove significant image errors and artifacts that may appear in the present frame as "ghost images" from radiation incidents during one or more prior frames.

In another embodiment, the method includes estimating the excess signal $S_E$ by using two reference image frames at two different frame times. Two reference image frames may be selected when the end of exposure time of a high-dose radiographic image is unknown. The two frame times of the two reference image frames may be based on the frame rate, and may be represented as frame numbers of the selected reference image frames. The method determines the difference in time between the two frame times and the frame time of the image selected for compensation. In one embodiment, estimating the excess signal $S_E$ may be done using a power function. The power function uses the total measured signal $S_T$ of at least one of the two reference image frames and the difference in time between the two reference image frames to determine a coefficient. The coefficient is then multiplied by a time-varying algebraic decay to estimate the excess signal $S_E$. In another embodiment, the excess signal $S_E$ may be estimated using a look-up table. One example of using a look-up table may include indexing a pre-calculated excess signal $S_{PRE}$ to estimate the excess signal $S_E$ using the frame number and measured signal $S_T$ of at least one of the two reference image frames. It should be noted that, in this embodiment, the frame number is determined using the difference in time between the frame times of the two reference image frames. The difference in time is then converted to a frame number based on the frame rate. In another embodiment, the excess signal $S_E$ may be estimated using a recursive function. One example of using a recursive function to estimate the excess signal $S_E$ includes using the measured signal $S_T$ of at least one of the two reference image frames selected and the difference in time between the two frame times of the two reference image frames to determine a previous frame coefficient. The previous frame coefficient is then used to determine a next frame coefficient. The next frame coefficient is then multiplied by the measured signal $S_T$ of the reference image frame to estimate the excess signal $S_E$ of the next frame. Once the estimation of excess signal $S_E$ has been determined using either the power function, and/or the look up table, and/or the recursive function, the method may include subtracting the estimated excess signal $S_E$ from the measured signal $S_T$ of an image frame. Subtracting the total excess signal $S_E$ on an image frame may remove significant image errors and artifacts that may appear in the present frame as "ghost images" from radiation incidents during one or more prior frames, such as frames of high-dose radiographic exposure.

Figure 1B:
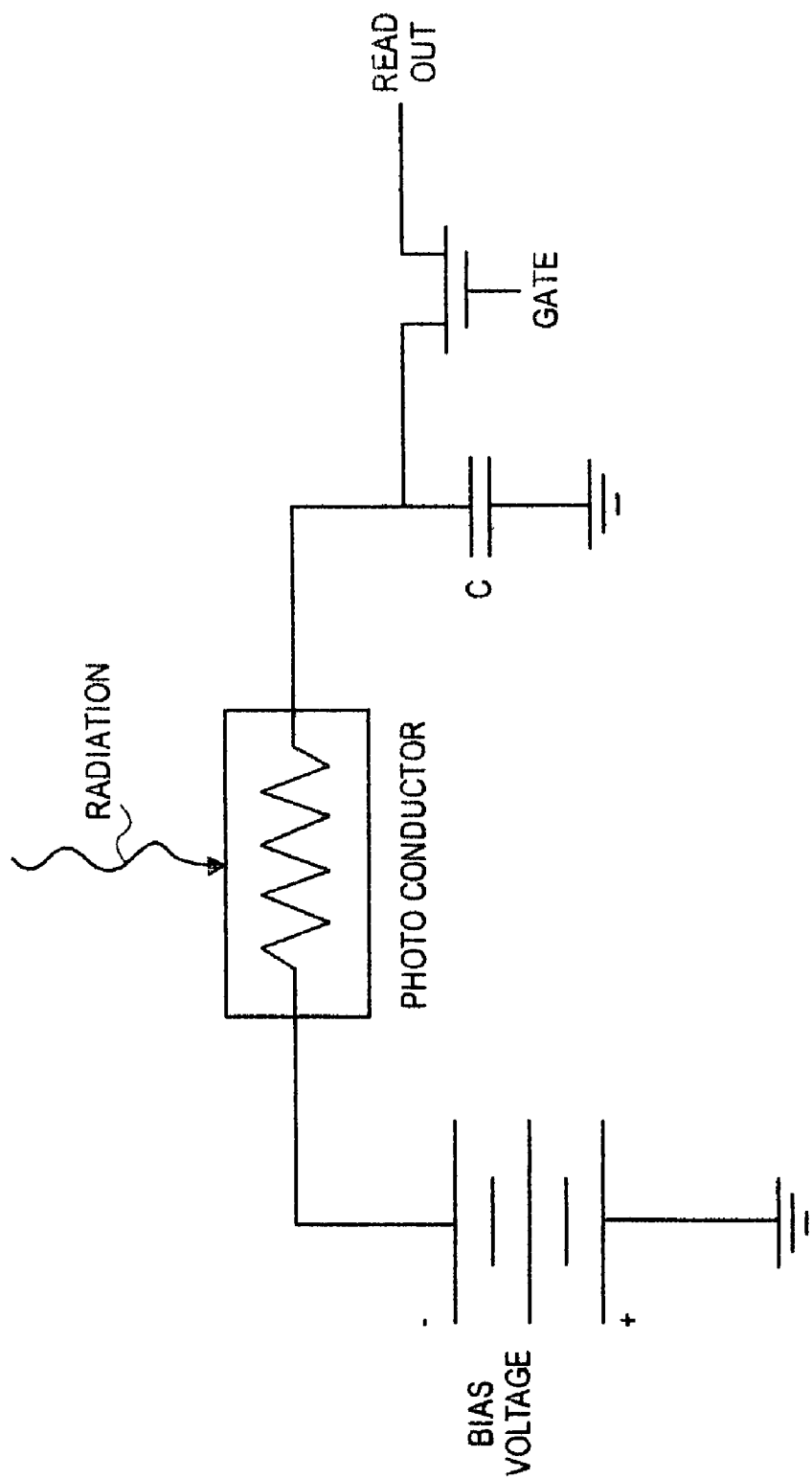
FIG. 1B illustrates an alternative configuration of an imager sensor array.
Figure 2A:
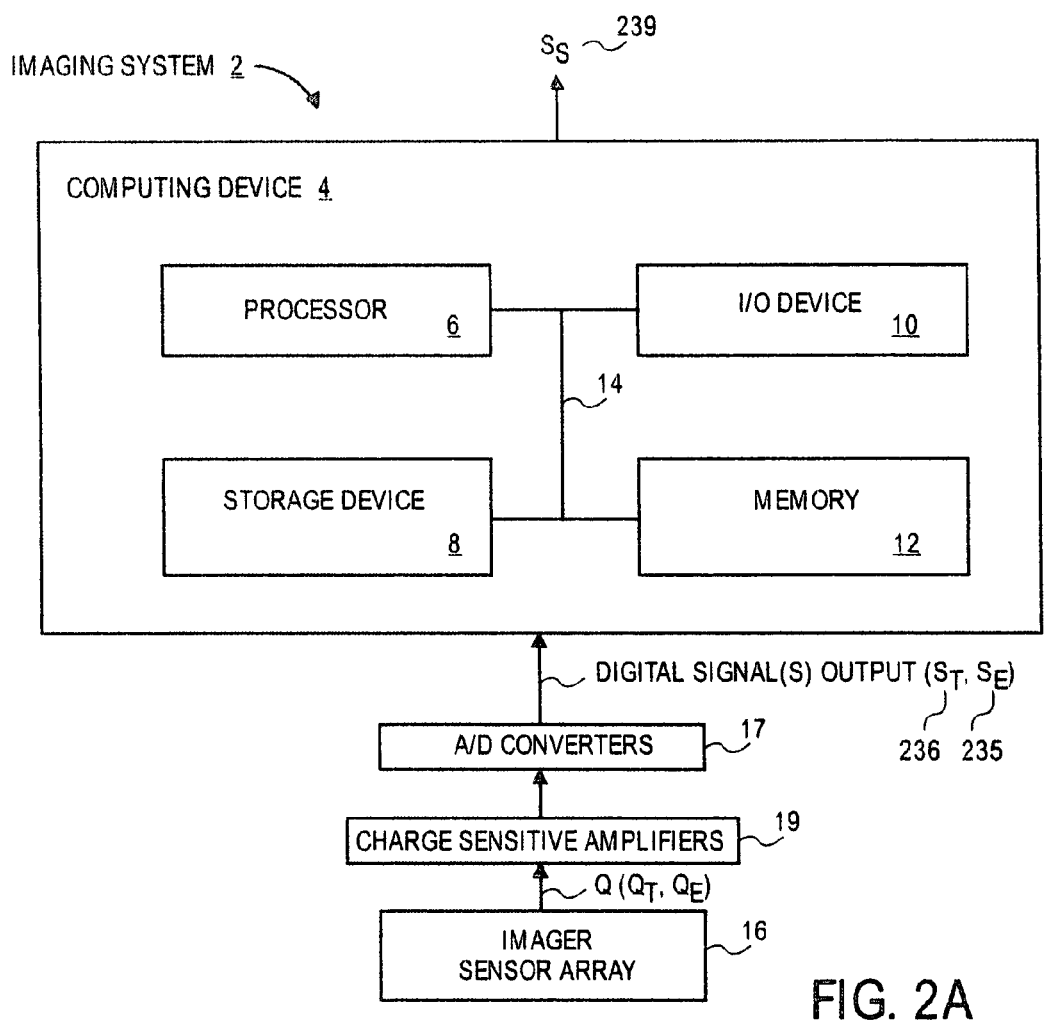
FIG. 2A illustrates one embodiment of an imaging system.

FIG. 2A illustrates one embodiment of an imaging system. Imaging system 2 includes a computing device 4 coupled to an imager sensor array 16. Imager sensor array 16 may be, for example, an amorphous silicon organic semiconductor TFT or diode-switched array imager. As previously discussed in relation to FIGS. 1A and 1B, imager sensor array 16 functions by accumulating charge on capacitors generated by pixels of p-i-n photodiodes (amorphous silicon or organic semiconductor) with scintillators or by pixels of biased photoconductors. Typically, many pixels are arranged over a surface of imager sensor array 16 where, for example, TFTs (or single and/or double diodes) at each pixel connect a charged capacitor to charge sensitive amplifier 19 at the appropriate time. Charge sensitive amplifiers 19 drive analog to digital (A/D) converter 17 that, in turn, converts the analog signals received from amplifiers 19 into digital signals (e.g., $S_T$, $S_E$) for processing by computing device 4. A/D converter 17 may be coupled to computing device 4 using, for example, I/O device 10 or interconnect 14. A/D converter 17 and charge sensitive amplifiers 19 may reside within computing device 4 or imager sensor array 16 or external to either device.

Computing device 4 implements the methods for correction of imaging sensors due to excess signal $S_E$ representative of the excess charge $Q_E$ discussed herein. The methods that may be performed by computing device 4 constitute computer programs made up of computer-executable instructions illustrated as steps in the following examples of the methods illustrated in the following figures. In one embodiment, computing device 4 includes a processor 6, storage device 8, input/output (IO) device 10, and memory 12 that are all coupled together with interconnect 14, such as a bus or other data path. In another embodiment, the computing device may be implemented using Programmable Logic Devices (PLD) or Field Programmable Gate Arrays (FPGA), in which the mathematical operations are performed by physical devices like adders, multipliers, etc. In another embodiment, the computing device may be implemented using specialized integrated circuits for data processing like adders, multipliers, bus switches, registers, RAM, ROM logic gates, etc.

Processor 6 represents a central processing unit of any type of architecture (e.g., Intel architecture or Sun Microsystems architecture), or hybrid architecture. In addition, processor 6 could be implemented in one or more semiconductor chips. Storage device 8 represents one or more mechanisms for storing data and/or instructions such as the method steps of the invention. Storage device 8 represents read-only memory (ROM), random access memory (RAM), magnetic disk storage media, optical storage media, flash memory devices, and/or other machine-readable media. Interconnect 14 represents one or more buses (e.g., accelerated graphics port bus, peripheral component interconnect bus, industry standard architecture bus, X-Bus, video electronics standards association related buses, etc.) and bridges (also termed bus controllers). I/O device 10 represents any of a set of conventional computer input and/or output devices including, for example, a keyboard, mouse, trackball or other pointing device, serial or parallel input device, display monitor, plasma screen, or similar conventional computer I/O devices. Memory 12 represents a high-speed memory device for retaining data and processor instructions for processor 6 according to the method steps of the invention. Memory 12 can be implemented using any of the memory devices described above for storage device 8. In addition, memory 12 can be used as a data cache for processor 6. While this embodiment is described in relation to a single processor computer system, in another embodiment, the invention may be implemented in a multi-processor computer system.

Figure 2B:
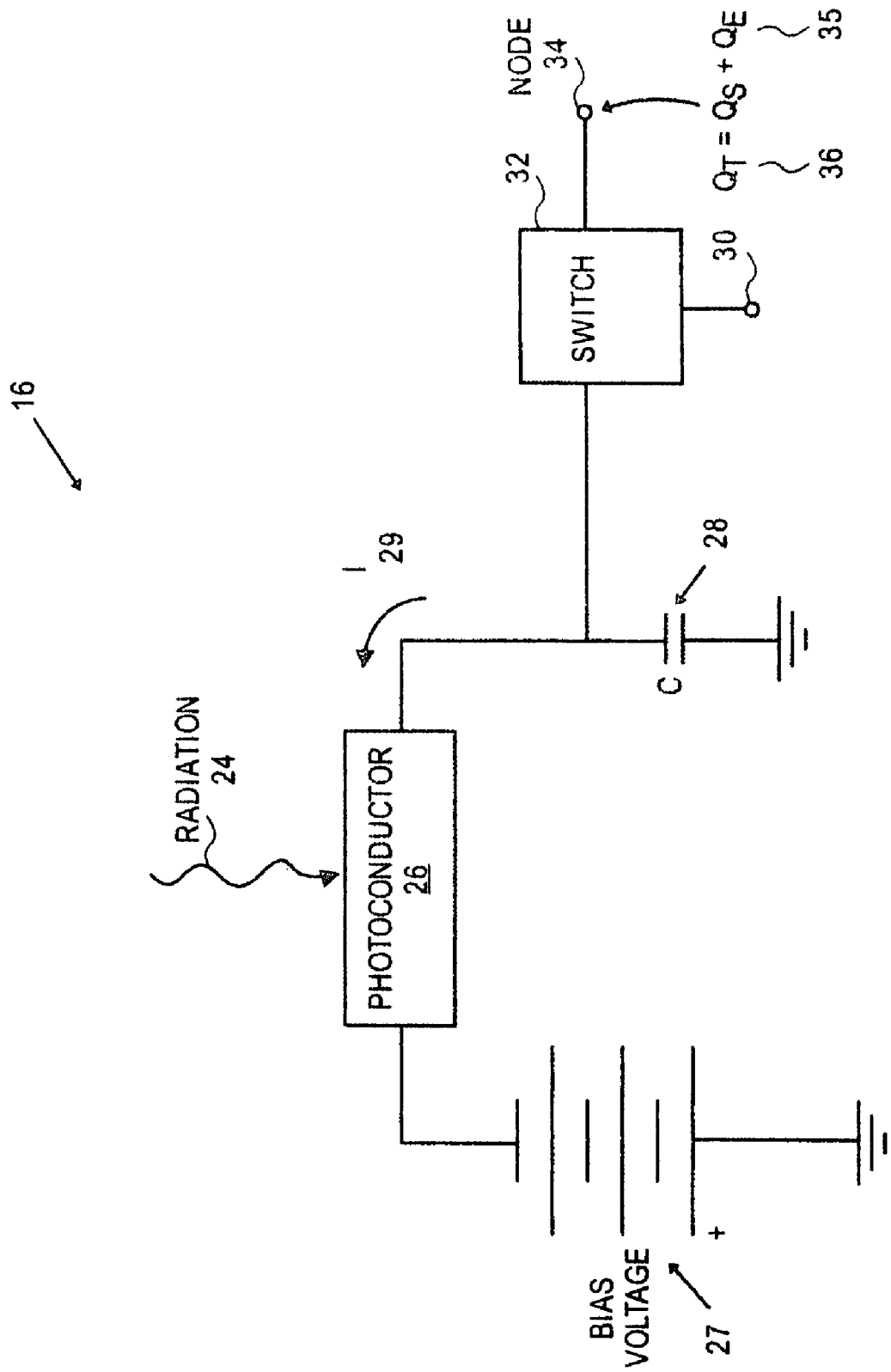
FIG. 2B illustrates one embodiment of an imager sensor array.
Figure 2C:
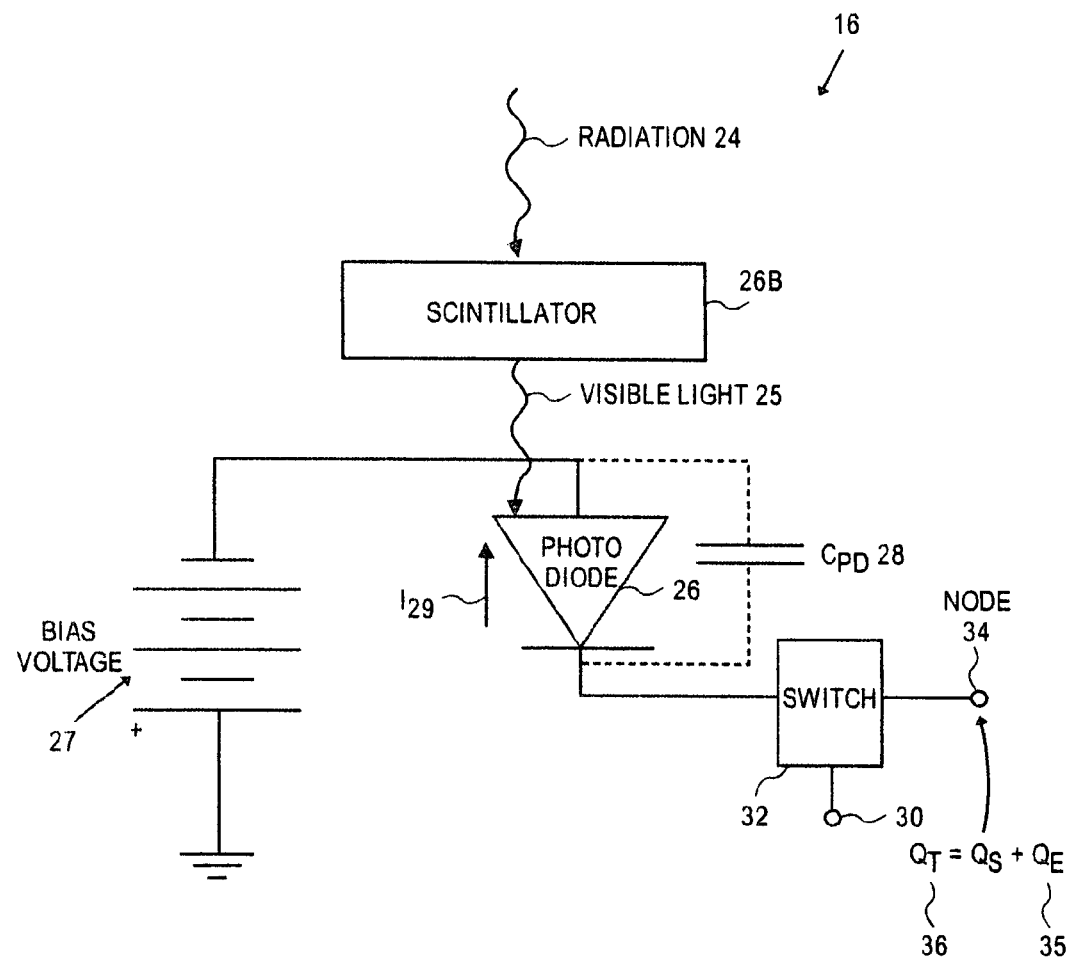
FIG. 2C illustrates another embodiment of an imager sensor array.

FIG. 2B illustrates one embodiment of the sensor array components of an imager. Imager sensor array 16 includes a bias voltage 27, a photoconductor 26, capacitor 28, and switch 32. Radiation 24 (X-rays, alpha, beta and gamma particles, neutrons etc.) has various energies depending on the particular embodiment of imager sensor array 16. In another embodiment the imager sensor array 16, illustrated in FIG. 2C, comprises a photodiode 26a receives visible light 25 from a scintillator 26b. The scintillator 26b receives radiation 24 (e.g., alpha, beta, gamma, X-ray, neutron, proton, etc.) and generates visible light 25. Visible light 25 strikes photodiode 26a and generates an electric current I 29.

In an alternative embodiment, imager sensor array 16 may have other configurations. For example, photoconductor 26 of FIG. 2B may be a phototransistor that directly receives radiation 24. In such an embodiment, the radiation 24 striking the biased phototransistor generates the electric current I 29.

The electric current I 29 charges capacitor 28 and leaves a charge value on capacitor 28, where the integrated charge on capacitor 28 is proportional to the integrated light intensity striking photoconductor 26 for a given integration time. Capacitor 28 is coupled to switch 32 (e.g., a TFT or switching diodes). At an appropriate time, the control input 30 (e.g., gate of a TFT) activates switch 32 and reads out the charge on capacitor 28 at node 34. The measured electric charge $Q_T$ 36 at node 34 may include the excess charge $Q_E$ 35.

One source of excess charge $Q_E$ 35 is switch 32. The operation of switch 32 is discussed below in relation to a TFT for ease of discussion purposes only. In another embodiment other types of switching devices may be used, for example, switching diodes, and may also be sources of excess charge $Q_E$ 35. When the charge value on capacitor 28 is read at node 34 there may be leakage current from gate 30 that contributes to the detected measured charge $Q_T$ 36 at node 34. Other sources of excess charge $Q_E$ 35 may be capacitor 28 and photoconductor 26. Lag from photoconductor 26 (or from photodiode 26a) arises from charge remaining in the present frame generated by radiation incident during one or more prior frames, resulting in a "ghost image" of these earlier frames. In addition, lag arises from incomplete discharge of the capacitor 28 due to insufficiencies like too few RC time constants during readout to completely discharge capacitor 28. If the lag source is persistent photocurrent from the photoconductor 26, one method to compensate for lag charge in a current pixel may be to subtract a fraction of the true image signal $S_i$ of one or more prior frames from the true image signal $S_i$ of the current pixel. If the lag source is a result of incomplete readout discharge of the capacitor 28, one method to compensate for the excess charge 35, may be to subtract a fraction of the measured signal $S_{Ti}$ from one or more prior frames. Image correction for the excess signal $S_E$ (representative excess charge $Q_E$ 35) composed of non-linear background signal $S_{NLi}$ and/or lag signal $S_{LAGi}$ may be increasingly helpful at imaging rates above 0.1 frames per second.

Excess signal $S_E$ may arise from other components that may be coupled to capacitor 28. Subtracting the excess signal $S_E$ 235 from the measured charge $S_{Ti}$ 236 provides the true image signal $S_{Si}$ 239 of an image of FIG. 2A.

Figures 3, 4:
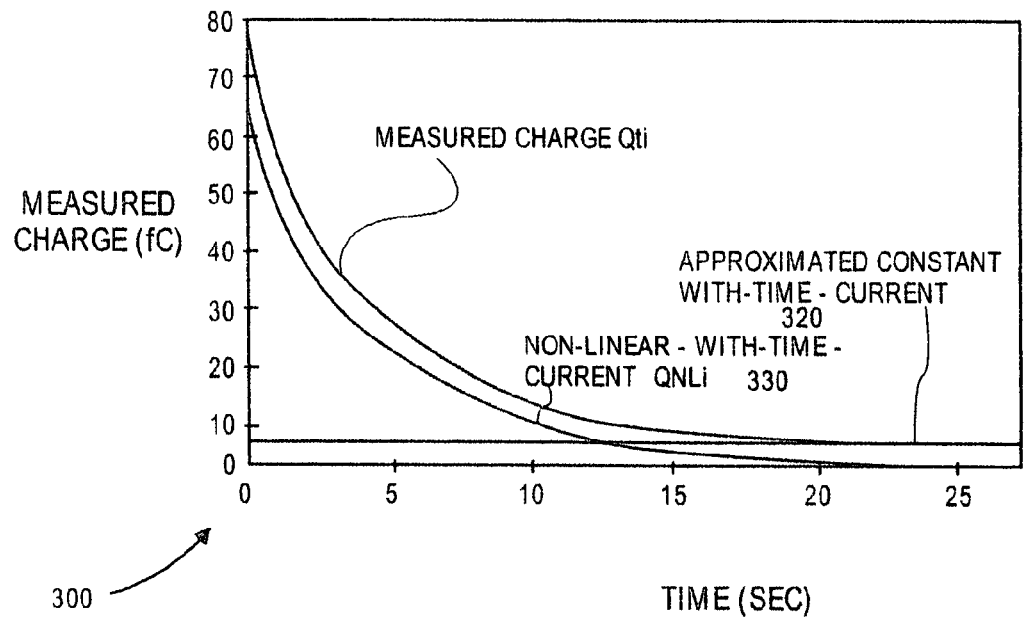
FIG. 3 illustrates one example of a graph of excess current generated by both a constant and time varying excess current components.
FIG. 4 is one expression for a time varying excess current $I_E$ and its integration with time to determine an excess charge $Q_E$ that is non-linear in time.

FIG. 3 illustrates one example of a graph from an amorphous silicon sensor showing measured capacitor charge (in femtocoulombs or fC), from excess current, estimated with a constant current component varying linearly with time, and estimated time varying current varying non-linearly with time. The horizontal axis of graph 300 shows time in seconds while the vertical axis shows capacitor charge in fC. Measured charge is the charge accumulated on the capacitor during the integration time (frame time), typically 30 milliseconds to 1000 milliseconds.

Measured charge 310 through the TFT of FIG. 1 is measured, in one example, by enabling the TFT (putting it in a low impedance state) for a short time (e.g., 5 to 200 microseconds) and transferring the charge accumulated on the sensor capacitor to a charge integration amplifier. Estimated constant measured charge with time, caused by the constant current 320, provides accurate estimation with image acquisition times greater than 20 seconds, as shown in graph 300. At image acquisition times below 20 seconds, the non-linear contribution $Q_{NLi}$, caused by the non-linear current, has an increased effect on pixel "i" charge correction.

One modeled expression for non-linear charge correction $Q_{NLi}$ 330 is shown in FIG. 4. $I_E(t)$ is one expression for current varying inversely with time, where K is a constant and t is the time in seconds. The integration time $T_i$ is determined by dividing one by the frame rate, shown in FIG. 6. One value for K is described below with FIG. 5. $Q_{NLi}$ is one expression for the excess (offset, background, or dark) charge $Q_E$ 35 of the measured charge $Q_{Ti}$ 36 for pixel "i" at node 34, and is calculated by integrating the excess current $I_E(t)$ over the frame period (integration time). One skilled in the art will recognize that $I_E(t)$ modeling is only one method for adjusting for time varying current. In an alternate embodiment, $I_E(t)$ may be estimated by using other methods, for example a continuous smooth curve fit. In yet another embodiment, for example, $I_E(t)$ is estimated by a theoretical model expression.

Figure 5:
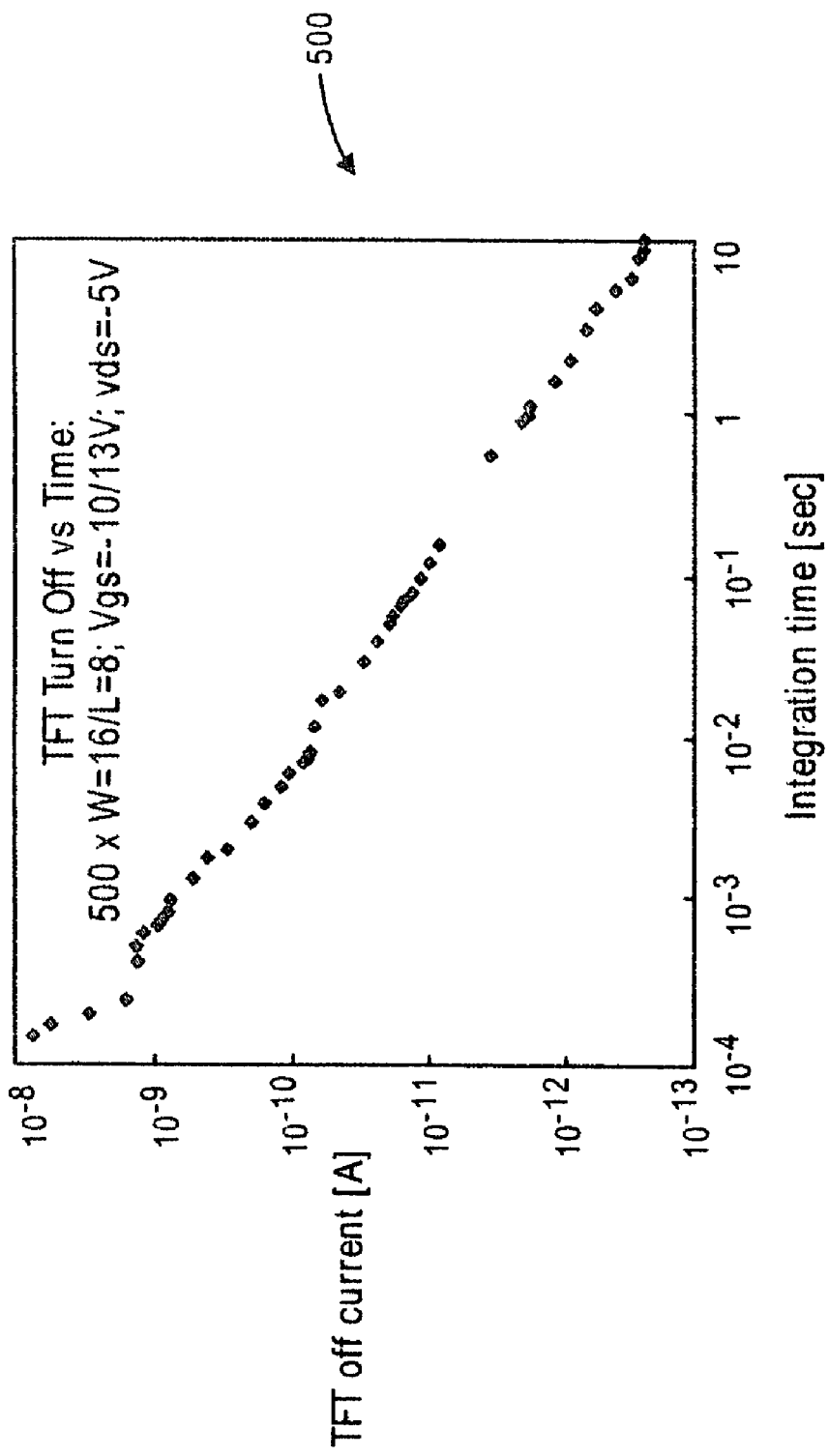
FIG. 5 illustrates one example of a graph showing time varying excess or leakage current for multiple TFTs connected in parallel.

FIG. 5 illustrates one example of graph 500 showing current on the vertical axis and time on the horizontal axis, for multiple TFTs connected in parallel. In one embodiment, K may be determined by placing 1000 TFTs in parallel and measuring the current with time varying from 0.0001 to 10 seconds. On graph 500, using a logarithmic scale for the time, the result is estimated as a straight line with a negative slope of $\sim T^{-1}$. Dividing by the 1000 TFTs results in $10^{-15}$ A (amp), which is one value for constant K. One skilled in the art will recognize that other methods of determining a value for K may be used. In one embodiment, for example, K is derived from theoretical values for TFTs. In another embodiment, K may be derived from measuring excess current from a system in which the invention is to be practiced.

Additional ways of modeling the time varying excess current may include:

$$I_E(t) = A \cdot t^n \tag{1}$$

In equation (1), n may be greater or less than zero but not equal to zero or one. The constant A may either be determined theoretically or by comparison with measured data. Some typical n values are, for examples, −0.3, −0.5, −1.0 and −1.3.

$$I_E(t) = \sum_{i=-m}^{n} B_i e^{D_i t} \quad (2)$$

In equation (2), $B_i$ and $D_i$ may be constants and m and n may be integers. $B_i$, $D_i$, m, and n, may be determined either theoretically or by comparison with measured data.

$$I_E(t) = \sum_{i=-m}^{n} F_i \cdot t^i \quad (3)$$

In equation (3), $F_i$ may be constant and m and n may be integers. $F_i$, m, and n, may be determined either theoretically or by comparison with measured data.

$$I_E(t) = \sum_{i=-n}^{n} G_n e^{in\pi T/1} \quad (4)$$

In equation (4), $G_n$ equals ½T times the integral (from $-T_i$ to $+T_i$) of $I_E(X)$ $e^{-in\pi x/T}$ with respect to x, and $T_i$ is the integration time interval of interest and n is an integer large enough for the calculated $I_E(T_i)$ value to approximate the observed value to the desired precision.

Figures 6, 7:
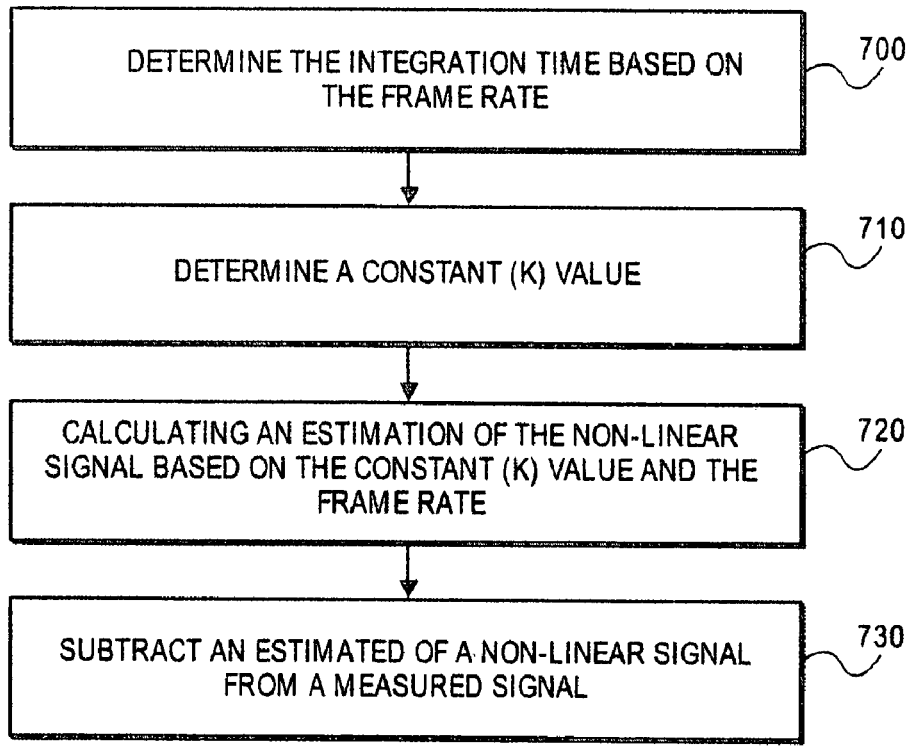
FIG. 6 illustrates a table correlating frame rate with integration time.
FIG. 7 is a flow diagram illustrating one embodiment of a method of estimating the excess signal and compensating for the excess signal in an imaging system.

FIG. 6 illustrates a table correlating frame rate with integration time. Integration time ($T_i$) is 1 divided by the frame rate. For example, a frame rate of 0.1 frames per second (FPS) yields an integration time of 10 seconds, a frame rate of 1 FPS yields an integration time of 1 second, a frame rate of 30 FPS yields an integration time of 0.033 seconds, and a frame rate of 100 FPS yields an integration time of 0.01 seconds.

FIG. 7 is a flow diagram illustrating one embodiment of a method of estimating the excess signal $S_E$ 235 output from A/D converters 19 (representative of $Q_E$ 35 in a pixel of a frame captured by the imager sensor array 16), and compensating for the excess signal $S_E$ in the pixel of the captured frame. It should be noted that the method described herein may be implemented by the computing device 4 to generate the excess signal $S_E$ 235. The integration time is determined based on the frame rate, step 700. As demonstrated with FIG. 6, integration time is the reciprocal of the frame rate. One skilled in the art will recognize that integration time is also used for methods other than integration.

The method determines a value for K as discussed, for example, above in relation to FIG. 5, step 710. In step 720, an estimation of the excess signal $S_E$ 235 composed of linear and non-linear background signal $S_{NL}$, and/or non-linear lag signal $S_{LAG}$, based on the constant (K) value and the frame rate, is calculated. In one embodiment, the excess signal $S_E$ 35 may be calculated, for example, by integrating $I_E(t)$, with the determined value of K, over the integration time (T)(the reciprocal of the frame rate), as described above with respect to FIG. 4. In another embodiment, the excess signal $S_E$ 235 may be calculated by summing $I_E(t)$ over a series of steps. In step 730, the estimation of excess signal $S_E$ 235 is subtracted from a measured signal $S_T$ 236. The measured signal $S_T$ 236 is, for example, representative of the measured charge $Q_T$ 36 read out of a node 34 of FIG. 2B at an appropriate time and contains contributions from the charge stored on capacitor 28, also in FIG. 2B, as well as non-linear charge contributions (excess charge 35) from TFT 32 if the frame rate is below 20 seconds per frame, see FIG. 1. The result from step 730 includes an estimation of the excess signal $S_E$ 235 arising from radiation incident on photodiode 26a from one or more prior frames that constitutes a lag contribution. In an alternative embodiment, the processor 6 may use a look-up table storing excess signal $S_E$ 235 estimates versus integrated time values based on frame rates.

Figure 8:
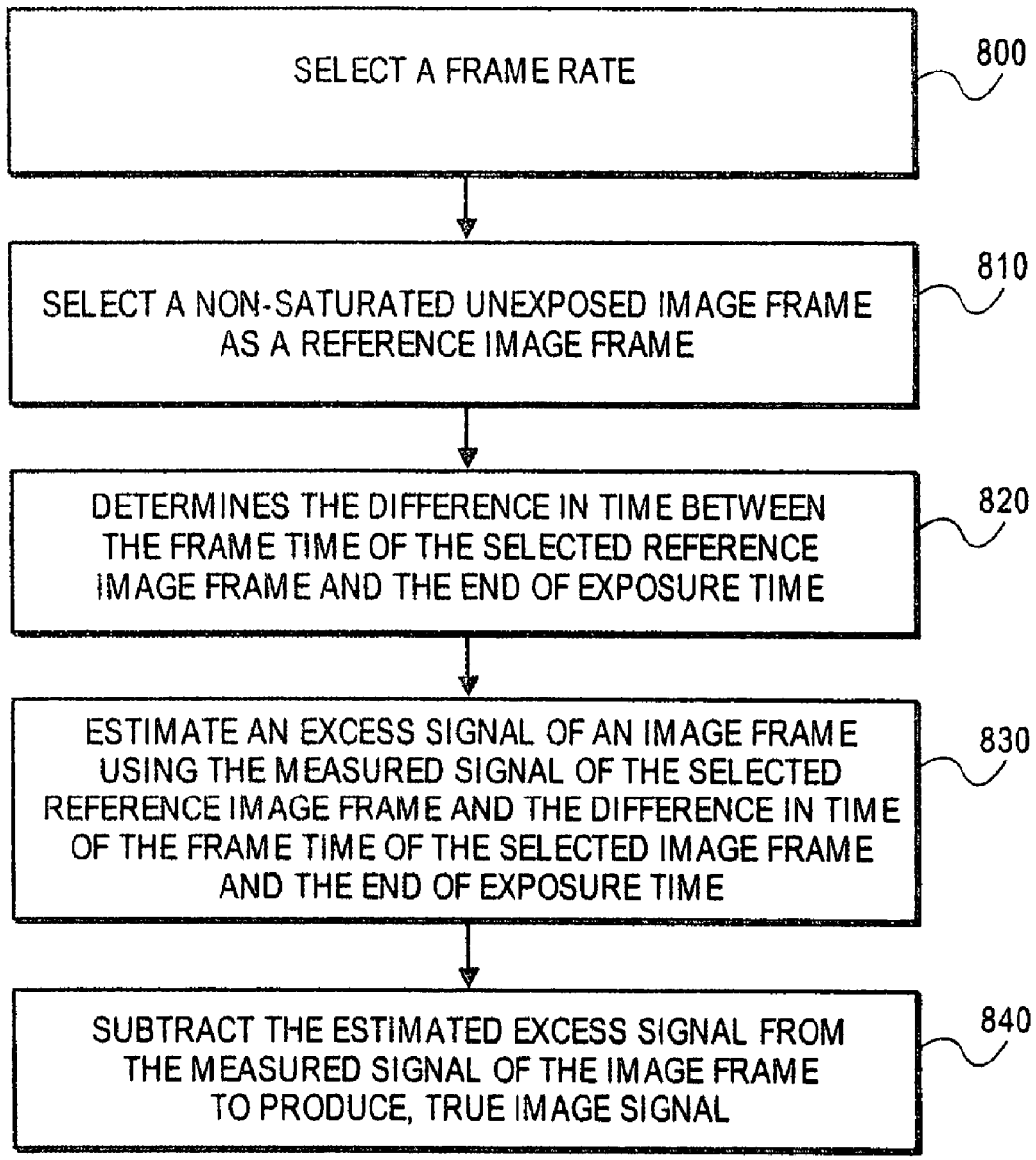
FIG. 8 is a flow diagram illustrating one embodiment of a method of estimating the excess signal using one reference image frame, and compensating for the excess signal in an imaging system.

FIG. 8 is a flow diagram illustrating one embodiment of a method of estimating the excess signal $S_E$ 235 from a pixel of a frame captured by the imager sensor array 16 using one reference image frame, and compensating for the excess signal $S_E$ 235 from the pixel of the captured frame. Each pixel of the reference image frame has a measured signal $S_T$ 236. The excess signal $S_E$ 235 may be estimated using the measured signal $S_T$ 236 from each pixel of the reference image frame and the difference in time between the end of exposure of a high-dose radiographic image and the frame time of the corrected image frame. The estimated excess signal $S_E$ 235 is then subtracted from the measured signal $S_T$ of the corrected image frame to produce the true image signal $S_S$ 239.

In one embodiment, the excess signal $S_E$ 235 may be estimated using a power function (described below). In another embodiment, the excess signal $S_E$ 235 may be estimated using a look-up table (described below). First, the method selects a frame rate, step 800. In step 810, a non-saturated, non-exposed image frame of the measured signal $S_T$ 236 is selected as a reference image frame. In step 820, the method determines the difference in time between the frame time of the selected reference image frame and the end of exposure time of the high-dose radiographic image. This difference in time may be determined using the frame rate. In another embodiment, time may be represented as frame numbers. In step 830, the excess signal $S_E$ 235 of an image frame is estimated using the measured signal $S_T$ 236 of the reference image frame and the difference in time between the end of exposure time and the frame time of the corrected image frame. The method in step 840 subtracts the estimated excess signal $S_E$ 235 of an image frame from the measured signal $S_T$ 236 of the corrected image frame to produce the true image signal $S_S$ 239. It should be noted that this method may be repeated for all pixels of an image frame. The true image signal $S_S$ 239 of each pixel of a frame provides a corrected image frame without significant image errors and artifacts that may appear in the image frame as "ghost" images from radiation incidents during one or more prior frames.

Figure 9:
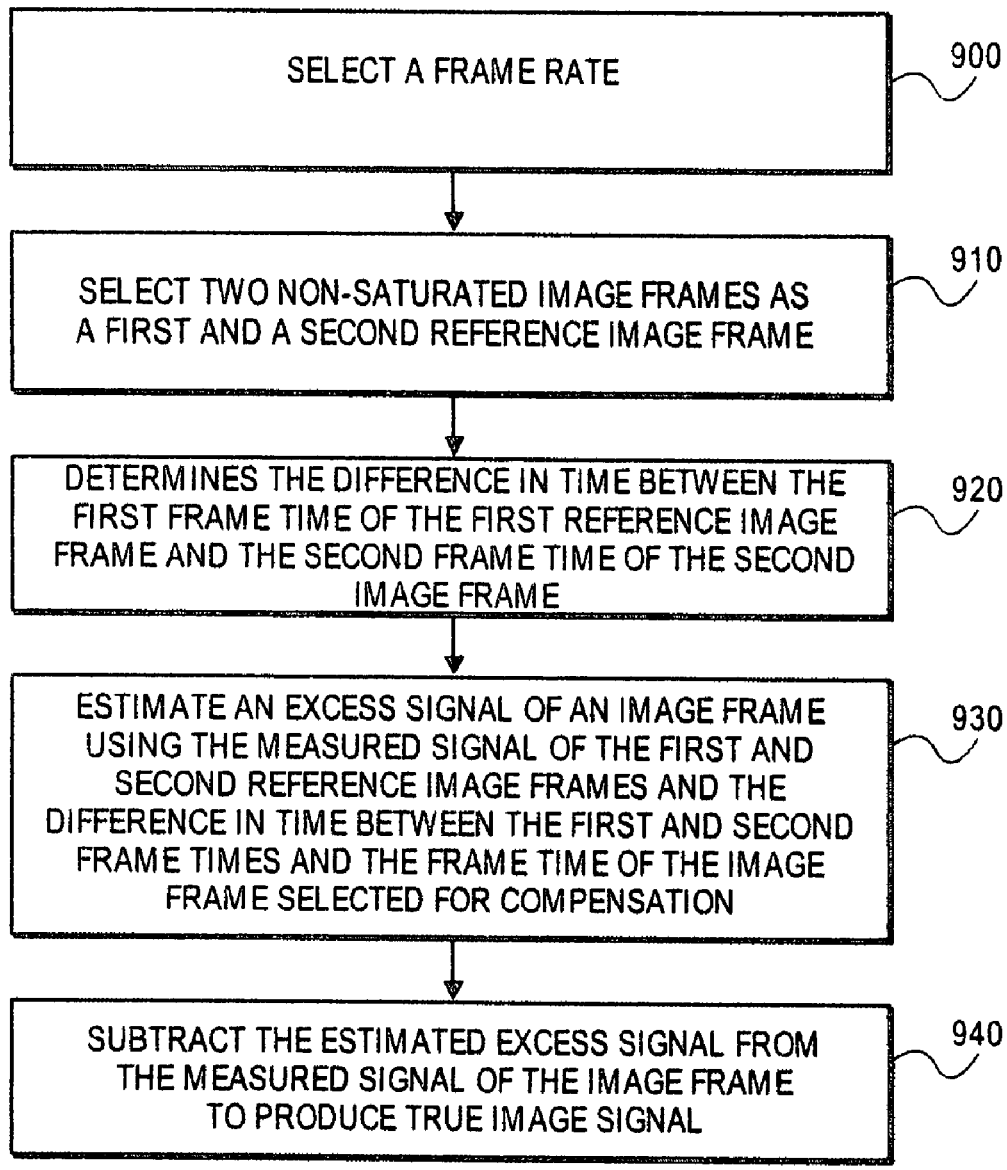
FIG. 9 is a flow diagram illustrating one embodiment of a method of estimating the excess signal using two reference image frames, and compensating for the excess signal in an imaging system.

FIG. 9 is a flow diagram illustrating one embodiment of a method of estimating the excess signal $S_E$ 235 in a pixel of a frame generated by the imager sensor array 16 using two reference image frames, and compensating for the excess signal $S_E$ 235 in the pixel of a captured frame. Each pixel of the first and second reference image frames has the corresponding measured signals $S_T$ 236. The excess signal $S_E$ 235 may be estimated using the measured signal $S_T$ 236 of each pixel of the first reference image frame, the measure signal $S_T$ 236 of each pixel of the second reference image frame, the difference in time between the first frame time of the first reference image frame and the second frame time of the second reference image frame and the difference in time between the frame time of the first or second reference image frame and the frame time of the captured image frame to be corrected. The estimated excess signal $S_E$ 235 is then subtracted from the measured signal $S_T$ 236 of the corrected image frame to produce the true image signal $S_S$ 239. The sources of excess signal $S_E$ 235 may be contributions from, for examples, leakage currents, dark/offset currents, and lag currents from the capacitor 28, and/or from the photoconductor 26, of the imager sensor array 16. It should be noted that the excess charge $Q_E$ 35 remaining from a radiographic image may create a "ghost" image in the subsequent fluoroscopic images. Estimating and compensating for the signal $S_E$ 235 representative of the excess charge $Q_E$ 35, reduces the residual "ghost" images presented by previous frames.

In one embodiment, the excess signal $S_E$ 235 may be estimated using a power function (described below). In one embodiment, the excess signal $S_E$ 235 may be estimated using a look-up table (described below). First, the method selects a frame rate, step 900. In step 910, two non-saturated, non-exposed image frames are selected as first and second reference image frames. In step 920, the method determines the difference in time between the first frame time of the first reference image frame and the second frame time of the second reference image frame. This difference in time may be determined using the frame rate. In another embodiment, time may be represented as frame numbers. In step 930, the excess signal $S_E$ 235 of an image frame is estimated using the at least one of the measured signal $S_T$ 236 of the first and second reference image frames and the difference in time between the first and/or second frame times to the selected frame for compensation. The method in step 940 subtracts the estimated excess signal $S_E$ 235 of an image frame from the measured signal $S_T$ 236 of the image frame to produce the true image signal $S_S$ 239. It should be noted that this method may be repeated for all pixels of an image frame. The true image signal $S_S$ 239 of each pixel of a frame creates a corrected image frame without significant image errors and artifacts that may appear in the image frame as "ghost images" from radiation incidents during one or more prior frames.

Figure 10A:
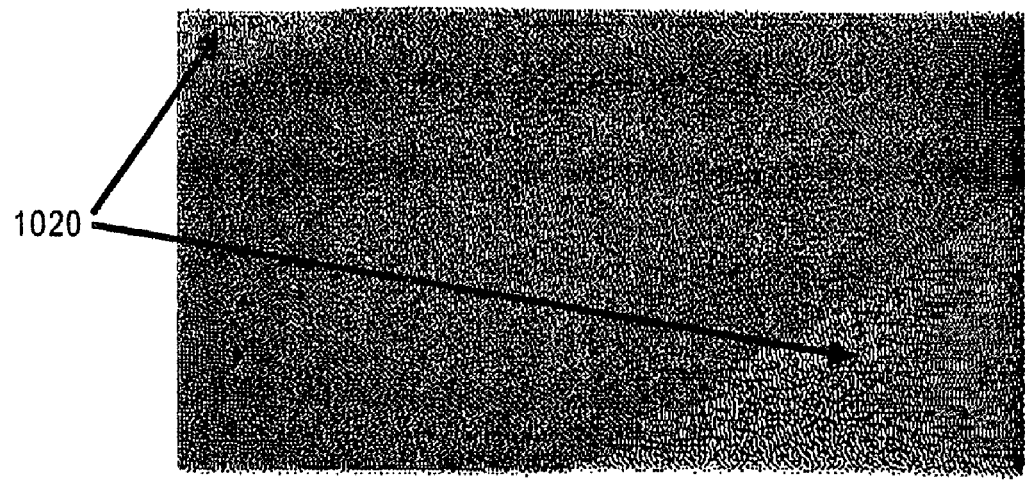
FIG. 10A illustrates an exemplary fluoroscopic image frame after radiographic exposure without compensation for the excess signal.
Figure 10B:
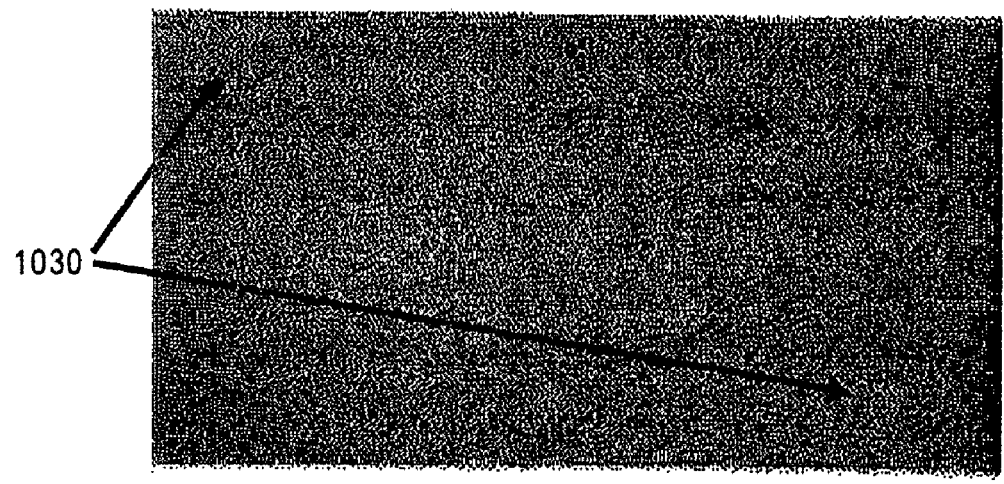
FIG. 10B illustrates an exemplary fluoroscopic image frame after radiographic exposure with compensation for the excess signal.

FIGS. 10A and 10B are exemplary fluoroscopic image frames illustrating compensation for excess signal $S_E$ 235 in an image F 1000 to produce the true image F 1010. FIGS. 10A and 10B contain the same fluoroscopic frame acquired shortly after radiographic exposure, uncompensated image frame F 1000 and compensated image frame F 1010. For the radiographic exposure, 20 cm of acrylic were placed at an angle on the imager sensor array 16. Approximately 3 seconds after the radiographic exposure the acrylic block was moved such that it became aligned to the horizontal orientation of the imager sensor array 16 and the fluoroscopic acquisition was started. Uncompensated frame F 1000 was acquired approximately 13 seconds after the radiographic exposure. The bright triangle shaped areas 1020 in the upper left hand corner and lower right hand corner in FIG. 10A are due to signal contribution of the radiographic "ghost." The compensated frame F 1010 of FIG. 10B uses the same window and level as used for FIG. 10A. The triangular shaped areas 1030 of FIG. 10B are significantly less visible than the triangle shaped areas 1020 of FIG. 10A.

Figure 11A:
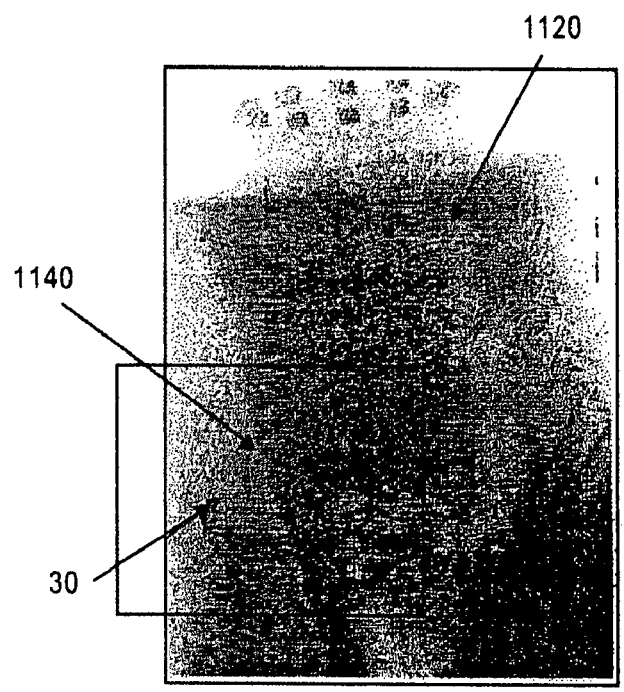
FIG. 11A illustrates an exemplary fluoroscopic image frame of a pelvis phantom after radiographic exposure without compensation for the excess signal.
Figure 11B:
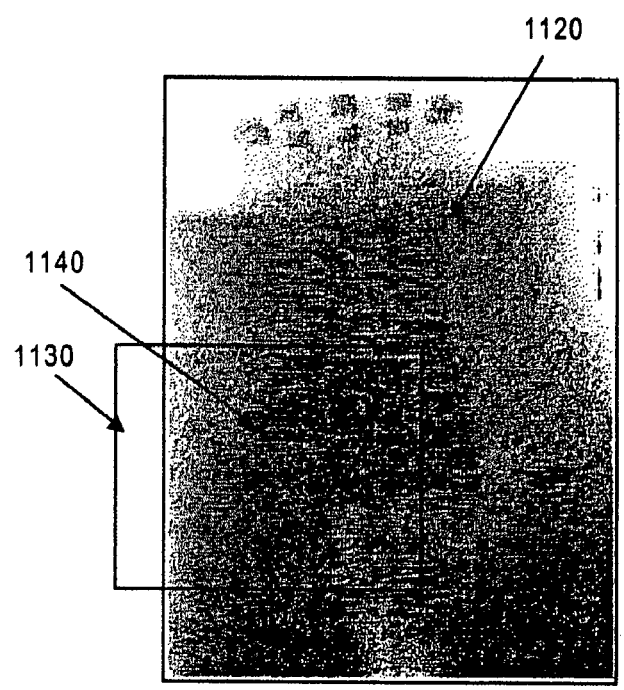
FIG. 11B illustrates an exemplary fluoroscopic image frame of a pelvis phantom after radiographic exposure with compensation for the excess signal.

FIGS. 11A and 11B are exemplary fluoroscopic image frames illustrating compensation for signal $S_E$ 235 in an image G 1100 to produce the true image G 1110 of a pelvis phantom. FIGS. 11A and 11B contain the same fluoroscopic frame acquired shortly after radiographic exposure, uncompensated image frame G 1100 and compensated image frame G 1110. The uncompensated frame G 1100 displayed in FIG. 11A shows an area 1130 where the signal contribution from the radiographic "ghost" introduces a visible image artifact 1140. FIG. 11B illustrates a compensated image frame G 1110 after estimating and compensating for the signal $S_E$ 235 in the uncompensated image frame G1100. The compensation of signal $S_E$ 235 reduces the artifact 1140 of the area 1130 of FIG. 11A.

Figure 12:
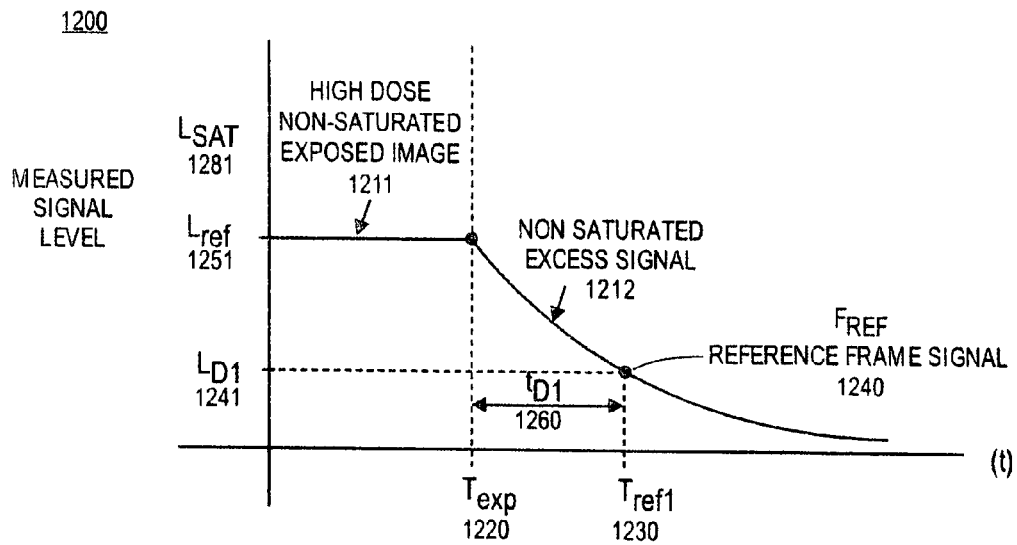
FIG. 12 illustrates one example of a graph showing measured signal levels in an imaging system as a function of time.

FIG. 12 illustrates one example of a graph 1200 showing the measured signal level as a function of time of imaging system 2. The measured signal level in time has two stages. The first stage is the measured signals during the exposure time $T_{exp}$ 1220 of a non-saturated exposed image 1211 of the imaging system 2. The second stage of the measured signal levels shows the non-saturated excess signal 1212 after the end of exposure time $T_{exp}$ 1220. The measured signal $S_T$ 236 is obtained A/D conversion of the measured charge at node 34 as previously discussed in relation to FIGS. 2A-2C.

The measured signal $S_T$ 236 of the high-dose non-saturated exposed image 1211 of FIG. 12 is represented as being a constant line at a charge level $L_{ref}$ 1251. In another embodiment, the measured high-dose non-saturated exposed image 1211 may be illustrated as a time-varying function. The measured charge of the high-dose non-saturated exposed image 1211 is measured at charge level $L_{ref}$ 1251 below the signal saturation level $L_{SAT}$ 1231. The non saturated excess signal 1212 is the amount of excess signal after the end of exposure time $T_{exp}$ 1220. Sources of the excess signal 1212 may be, for examples, leakage currents, dark/offset currents, and lag contribution currents from the capacitor 28, and/or from the photoconductor 26, and/or from the switch 32, of the imager sensor array 16. If not removed, the contribution due to the excess signal 1212 introduces "ghost" images in the subsequent images.

Graph 1200 illustrates the non-saturated excess signal 1212 having a non-linear decay response after the end of exposure time $T_{exp}$ 1220 of a high dose non-saturated exposed image 1211. An exemplary non-saturated excess signal 1212 automatically begins to decay because the measured high-dose non-saturated exposed image 1211 is at a non-saturated signal level $L_{ref}$ 1251 ($L_{ref}$ 1251 is less than current saturation level $L_{SAT}$ 1231). The method described with respect to FIG. 8 uses the non-saturated excess signal 1212 to estimate the excess signal $S_E$ 235 of subsequent frames. As described in FIG. 8, step 810, a non-saturated reference image frame is selected. The reference image frame $F_{ref1}$ 1240 is illustrated in FIG. 12. The method uses the measured non-saturated charge level $L_{D1}$ 1241 and the difference in time $t_{D1}$ 1260, determined in step 820, to estimate the excess signal, step 830. The method subtracts the estimated excess signal $S_E$ 235, step 840, to compensate the measured signal $S_T$ 236 to produce a true image $S_S$ 239 output from imaging system 2. The difference in time $t_{D1}$ 1260 is determined by subtracting the frame time $T_{ref1}$ 1230 of the reference image frame $F_{ref1}$ 1240 of the measured non-saturated excess signal 1212, from the end of exposure time $T_{exp}$ 1220, step 820. In one embodiment, the excess signal $S_E$ 235 may be estimated using the difference in time $t_{D1}$ 1260 and the measured $L_{D1}$ 1241 of reference image frame $F_{ref1}$ 1240 in a function of integration time as described previously in relation to FIG. 7. In another embodiment, the excess signal $S_E$ 235 may be estimated using the difference in time $t_{D1}$ 1260 and the measured $L_{D1}$ 1241 of reference image frame $F_{ref1}$ 1240 in a power function. In another embodiment, the excess signal $S_E$ 235 may be estimated using the difference in time $t_{D1}$ 1260 and the measured $L_{D1}$ 1241 of reference image frame $F_{ref1}$ 1240 in a look-up table. In another embodiment, the excess signal $S_E$ 235 may be determined using a power function and a look up table. In another embodiment, the difference in time $t_{D1}$ 1260, the end of exposure time $T_{exp}$ 1220, and the frame time $T_{ref1}$ 1230 of reference image frame $F_{ref1}$ 1240, may be in terms of frame numbers. The frame numbers may be computed using the frame rate as known to one of ordinary skill in the art.

Figure 13:
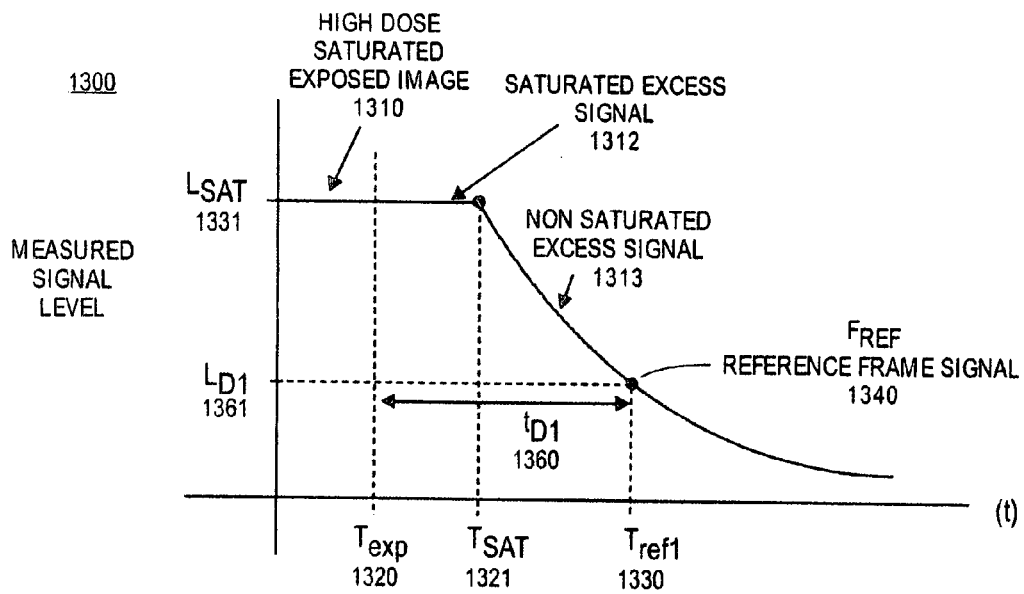
FIG. 13 illustrates another example of a graph showing measured signal levels in an imaging system as a function of time.

FIG. 13 illustrates one example of a graph 1300 showing the measured signal levels as a function of time of imaging system 2. The measured signal $S_T$ 236 in time has three stages. The first stage is the measured signal up to the end of the exposure time $T_{exp}$ 1320 of a high-dose saturated exposed image 1311. The second stage of the measured signal $S_T$ 236 shows the saturated excess signal 1312 after the end of exposure time $T_{exp}$ 1320. The third stage of the measured signal $S_T$ 236 shows the non-saturated excess signal 1313 after the end of saturation time $T_{SAT}$ 1321. The measured signal $S_T$ 236 is obtained in the same manner as described in relation to FIG. 12.

The measured signal $S_T$ 236 of the high-dose saturated exposed image 1311 of FIG. 13 is represented as being a constant line because the measured signal $S_T$ 236 is saturated at the signal saturation level $L_{SAT}$ 1331. The measured saturated excess signal 1312 is also saturated at the signal saturation level $L_{SAT}$ 1331 and is represented as a constant line until the end of saturation time $T_{SAT}$ 1321.

Graph 1300 illustrates the non-saturated excess signal 1313 having a non-linear decay response after the end of exposure time $T_{exp}$ 1320 of a high dose non-saturated exposed image 1311. The method described with respect to FIG. 8 uses the measured non-saturated signal $S_T$ to estimate the excess signal $S_E$ 235 of subsequent frames. As described in FIG. 8, step 810, a non-saturated reference image frame is selected. The reference image frame signal $F_{ref1}$ 1340 is illustrated in FIG. 13. The method uses the measured non-saturated signal level $L_{D1}$ 1361, the difference in time $t_{D1}$ 1360 and the difference in time between the end of the exposure $T_{exp}$ and the time of the frame being corrected (compensated), as determined in step 820, to estimate the excess signal $S_E$ 235, step 830. The method subtracts the estimated excess signal $S_E$ 235, step 840, to compensate the measured non-saturated signal 1313 to produce a true image signal $S_S$ 239 at the output of imaging system 2. The difference in time $t_{D1}$ 1360 is determined by subtracting the frame time $T_{ref1}$ 1330 of the reference image frame signal $F_{ref1}$ 1340 of the measured non-saturated excess signal 1313, from the end of exposure time $T_{exp}$ 1320, step 820. In one embodiment, the excess signal $S_E$ 235 may be estimated using the difference in time $t_{D1}$ 1360 and the measured signal level $L_{D1}$ 1361 of reference image frame signal $F_{ref1}$ 1340 in a function of integration time as described previously in relation to FIG. 7. In another embodiment, the excess signal $S_E$ 235 may be estimated using the difference in time $t_{D3}$ 1360 and the measured signal level $L_{D1}$ 1361 of reference image frame signal $F_{ref1}$ 1340 in a power function. In another embodiment, the excess signal $S_E$ 235 may be estimated using the difference in time $t_{D3}$ 1360 and the measured signal level $L_{D1}$ 1361 of reference image frame $F_{ref1}$ 1340 in a look-up table. In another embodiment, the excess signal $S_E$ 235 may be determined using a power function and a look up table. In another embodiment, the difference in time $t_{D3}$ 1360, the end of exposure time $T_{exp}$ 1320, the end of saturation time $T_{SAT}$ 1321, and the frame time $T_{ref1}$ 1330 of reference image frame $F_{ref1}$ 1340, and the difference in time between the end of exposure time $T_{exp}$ 1320 and the time of the image frame to be corrected, may be in terms of frame numbers. The frame numbers may be computed using the frame rate as known to one of ordinary skill in the art.

Figures 14, 15:
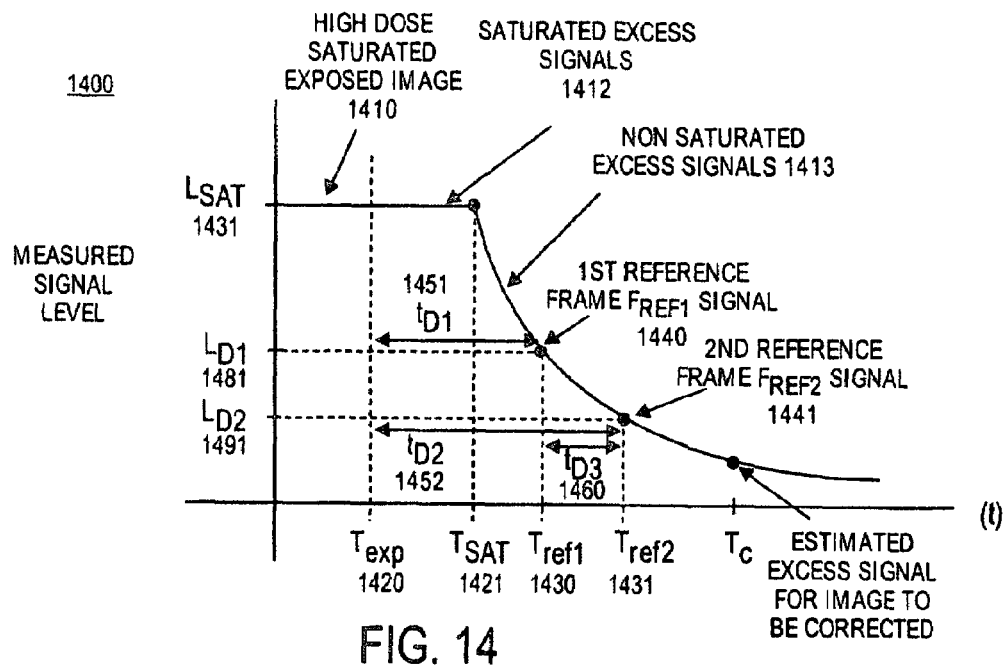
FIG. 14 illustrates another example of a graph showing the measured signal levels in an imaging system as a function of time.
FIG. 15 illustrates one example of a look-up table.

FIG. 14 illustrates one example of a graph 1400 showing the measured signal level as a function of time. The measured signal $S_T$ 236 in time has three stages. The first stage is the measured signal $S_T$ 236 up to the end of the exposure time $T_{exp}$ 1420 of a high-dose saturated exposed image 1410. The second stage of the measured signal $S_T$ 236 shows the saturated excess signal $S_E$ 1412 after the end of exposure time $T_{exp}$ 1420. The third stage of the measured signal $S_T$ 236 shows the non-saturated excess signal $S_E$ 1413 after the end of saturation time $T_{SAT}$ 1421. The measured signal $S_T$ 236 may be obtained in the same manner as described in relation to FIG. 12. The measured charge of the high-dose saturated exposed image 1410 of FIG. 14 is represented as being a constant line because the signal is saturated at the signal saturation level $L_{SAT}$ 1431. The measured saturated excess signal 1412 is also saturated at signal saturation level $L_{SAT}$ 1431 and is represented as a constant line until the end of saturation time $T_{SAT}$ 1421.

Graph 1400 illustrates the measured non-saturated excess signal 1413 having a non-linear decay response after the end of saturation time $T_{SAT}$ 1421 of a high dose non-saturated exposed image 1411. The method described with respect to FIG. 9 uses the measured non-saturated excess signal 1413 to estimate the excess signal $S_E$ 235 of subsequent frames. As described in FIG. 9, step 910, two non-saturated reference image frames are selected. The first reference image frame $F_{ref1}$ 1440 and the second reference image frame $F_{ref2}$ 1441 are illustrated in FIG. 14. The method uses the measured non-saturated signal levels $L_{D1}$ 1481 and $L_{D2}$ 1491, the difference in time $t_{D3}$ 1460 and the difference in time between the first or the second reference frame time and the time of the image frame to be corrected, determined in step 920, to estimate the excess signal $S_E$ 235, step 930. The method subtracts the estimated signal $S_E$ 235, step 940, to compensate the measured excess signal 1413 to produce a true image charge $S_S$ 239. The difference in time $t_{D3}$ 1460 is determined by subtracting the first frame time $T_{ref1}$ 1430 of the reference image frame $F_{ref1}$ 1440 from the second frame time $T_{ref2}$ 1431 of the reference image frame $F_{ref2}$ 1441 of the measured non-saturated excess signal 1413, step 920. In one embodiment, the excess signal $S_E$ 235 may be estimated using the difference in time $t_{D3}$ 1460, the measured signal level $L_{D1}$ 1481 and $L_{D2}$ 1491 of reference image frames $F_{ref1}$ 1440 and $F_{ref2}$ 1441 and the difference in time between the first or the second reference frame time and the time of the image frame to be corrected in a function of integration time as described previously in relation to FIG. 7. In another embodiment, the excess signal $S_E$ 235 may be estimated using the difference in time $t_{D3}$ 1460, the measure signal level $L_{D1}$ 1481 and $L_{D2}$ 1491 of reference image frames $F_{ref1}$ 1440 and $F_{ref2}$ 1441 and the difference in time between the first or the second reference frame time and the time of the image frame to be corrected in a power function. In another embodiment, the excess signal $S_E$ 235 may be estimated using the difference in time $t_{D3}$ 1460, the measure signal level $L_{D1}$ 1481 and $L_{D2}$ 1491 of reference image frames $F_{ref1}$ 1440 and $F_{ref2}$ 1441 and the difference in time between the first or the second reference frame time and the time of the image frame to be corrected in a look-up table. In another embodiment, the excess signal $S_E$ 235 may be estimated using the difference in time $t_{D3}$ 1460, the measured signal level $L_{D1}$ 1481 and $L_{D2}$ 1491 of reference image frames $F_{ref1}$ 1440 and $F_{ref2}$ 1441 and the difference in time between the first or the second reference frame time and the time of the image frame to be corrected in a recursive function.

In another embodiment, the difference in time $t_{D3}$ 1460, the end of exposure time $T_{exp}$ 1420, the difference in time $t_{D1}$ 1451, the difference in time $t_{D2}$ 1452, the end of saturation time $T_{SAT}$ 1421, the first frame time $T_{ref1}$ 1430 of the first reference image frame $F_{ref1}$ 1440, the second frame time $T_{ref2}$ 431 of the second reference image frame $F_{ref2}$ 1441, and the difference in time between the first or second reference frame time and the time of the image frame to be corrected, may be in terms of frame numbers. The frame numbers may be computed using the frame rate as known to one of ordinary skill in the art.

In one embodiment, a power function may be used in estimating the excess signal $S_E$ 235, as described in relation to FIGS. 8, 9, 12, 13, and 14. The following description and equations are used as one method of estimating the excess signal $S_E$ 235 using a power function. The power function estimates the excess signal $S_E$ 235 of the measured signal $S_T$ 236. After compensating for the excess signal $S_E$ 235 of the measured signal $S_T$ 236, using the power function, the excess signal $S_E$ 235 may be subtracted from the measured signal $S_T$ 236 to produce a corrected true image signal $S_S$ 239 without "ghost" images from previous radiographic image frames. It should be noted that the power function estimation of the excess signal $S_E$ 235 may be done for each pixel of a frame. The compensation of the excess signal $S_E$ 235 may also be done for each pixel of a frame to create true image signal $S_S$ 239.

One example of the power function approximation is shown in the following equations.

$$S_E(t) \cong S_E(t_o) \cdot t^{-\alpha} \qquad (5)$$

$$S_E(nT) \cong S_E(t_o) \cdot (nT)^{-\alpha} \qquad (6)$$

$$T = \frac{1}{FrameRate} \qquad (7)$$

Equation (5) approximates the excess signals $S_E$ 1212, 1313, and 1413 shown in FIGS. 12, 13, and 14, respectively. $S_E(t)$ represents the estimated excess signals 1212, 1313, and 1413. Exponent $\alpha$ can be assumed to be constant for a wide range of radiographic exposures. The continuous time variable t is the time after the end of exposure $T_{exp}$ 1220, 1320, and 1420. $S_E(t_o)$ represents a lag reference constant of the excess signals 1212, 1313, or 1413. Constant $S_E(t_o)$ is unique for each radiographic exposure. In another embodiment, the continuous time variable t of equation (5) may be replaced with discrete frame time nT, equation (6). T is the reciprocal of the frame rate of the imager sensor array 16, equation (7). The variable n is a positive integer such that discrete frame time nT is greater than end of exposure time $T_{exp}$ 1220, 1320, and 1420. Equation (6) illustrates this substitution and shows the discrete nature of the imager sensor array 16.

$$S_{E\ comp}(t) = S_{E\ meas}(t) - S_E(t) \qquad (8)$$

$$S_{E\ comp}(t) = S_{E\ meas}(t) - S_E(t_o) \cdot (t)^{-\alpha} \qquad (9)$$

Equation (8) illustrates how the excess signal $S_E$ of image F is subtracted from the measured signal $S_T$ 36 of Frame F to obtain the compensated signals $S_S(t)$. $S_S(t)$ represents the charge of frame F after compensation as a function of time. $S_T(t)$ represents the measured charge of frame F before compensation at a particular point in time after $T_{exp}$ 1220, 1320, and 1420. $S_E(t)$ represents, as described in relation to (5), the approximation of the excess signals 1212, 1313, and 1413 as a function of time, as shown in FIGS. 12, 13, and 14, respectively. Combining the two equations (5) and (8), results in equation (9).

$$S_{E\ comp}(nT) = S_{E\ meas}(nT) - S_E(nT) \qquad (10)$$

$$S_{E\ comp}(nT) = S_{E\ meas}(nT) - S_E(t_o) \cdot (nT)^{-\alpha} \qquad (11)$$

Equation (10) illustrates how the excess signal $S_E$ of image F is subtracted from the measured signal $S_T$ 26 of Frame F to compensate for that excess signal $S_E$ 235 as a function of frame number. $S_S(nT)$ represents the charge of frame F after compensation as a function of frame number. $S_T(nT)$ represents the measured signal $S_T$ 236 of frame F before compensation for a particular frame. $S_E(nT)$ represents, as described in relation to equation (6), the approximation of the excess signals 1212, 1313, and 1413 as a function of frame number. Combining the equations (6) and (10) results in equation (11).

$$S_E(t_o)(t_{D1}) = L_{D1} \cdot t_{D1}{}^{\alpha} \qquad (12)$$

$$t_{D1} = T_{ref1} - T_{exp} \qquad (13)$$

$$S_E(t) = S_E(t) - (L_{D1} \cdot t_{D1}{}^{\alpha}) \cdot (t)^{-\alpha} \qquad (14)$$

Equation (12) illustrates how the lag reference constant $S_E(t_o)$ is derived if the time reference $t_{D1}$ is known. Time reference $t_{D1}$ represents the difference in time of the end of the exposure $T_{exp}$ and the time of reference of the first reference image frame acquired $T_{ref}$, as shown in equation (13). Examples of $t_{D1}$ are shown in FIGS. 12, and 13, as the difference in time $t_{D1}$ 1260, and the difference in time $t_{D1}$ 1360, respectively. Signal level $L_{D1}$ 1241 and signal level $L_{D1}$ 1361 of FIGS. 12, and 13, represent the measured signal of the acquired reference image frames $F_{ref1}$ 1240, and $F_{ref1}$ 1340, respectively. Combining equations (9) and (12) results in equation (14). It should be noted that the variable t of equations (12), (13), and (14) may be in terms of a particular frame number in discrete frame time nT. The particular frame number in discrete frame time nT, is determined by n, the positive integer frame number, and the reciprocal of the frame rate, T (see equation (7)).

$$t_{D1} \approx \frac{t_{D3}}{\left(\left(\frac{L_{D1}}{L_{D2}}\right)^{\frac{1}{\alpha}} - 1\right)} \qquad (15)$$

$$t_{D3} = t_{ref2} - t_{ref1} \qquad (16)$$

$$L_{D(k+1)} = L_{D1} \cdot \left(1 + k \cdot \left(\left(\frac{L_{D1}}{L_{D2}}\right)^{\frac{1}{\alpha}} - 1\right)\right)^{-\alpha} \qquad (17)$$

$$L_{D(k+1)} = L_{D1} \cdot \left(\frac{1}{\left(1 + k \cdot \left(\frac{L_{D1}}{L_{D2}}\right) - 1\right)}\right) \qquad (18)$$

Equation (15) illustrates how to approximate the time $t_{D1}$ used in equation (12) to calculate the lag reference constant $S_E(t_o)$, if the time elapsed between the end of the radiographic exposure $T_{exp}$ 1420 and the time references $T_{ref1}$ 1430 and $T_{ref2}$ 1431 of FIG. 14 are unknown. The difference in time $t_{D3}$ 1460 is the difference in time between the first frame time $T_{ref1}$ 1430 of the first reference image frame 1440 and the second frame time $T_{ref2}$ 1431 of the second reference image frame 1441, equation (15). Signal level $L_{D1}$ represents the measured charge of the first reference image frame $F_{ref1}$ 1440. Signal level $L_{D2}$ represents the measured charge of the second reference image frame $F_{ref2}$ 1490. If difference in time $t_{D3}$ 1460 is set equal to time T of equation (15), which is the reciprocal of the frame rate (equation (7)), then equations (12) and (14) may be combined to become equation (17). The variable k of equation (17) represents a positive integer number starting at one. Signal level $L_{D(k+1)}$ of equation (17) represents the estimated excess signal $S_E$ 235 for the next frame. Measured values for the constant $\alpha$ of equation (17) range from 1.05 to 1.08 in imager sensor array 16. In one embodiment, in order to simplify hardware implementation the constant $\alpha$ may be set to equal 1.0. The simplified equation (17), substituting the constant $\alpha$ with the number 1.0, is shown in equation (18).

FIG. 15 illustrates one example of a look-up table used to index the pre-calculated estimated excess signals using the measured signals at a given time. The selected excess signal may then be compensated for in the measured signals to produce the true signal of the image. The look-up table is used in one embodiment, to index a pre-calculated excess signal to estimate the excess signal $S_E$ as a function of time. In another embodiment, the look-up table is used to index a pre-calculated excess signal to estimate the excess signal $S_E$ as a function of frame number. The frame number and the measured charges of the reference image frame are used to index the corresponding pre-calculated excess charge. The indexed pre-calculated excess signal may be subtracted from the measured signal of the image to produce the true image signal $S_S$. It should be noted that pre-calculated excess signal may be indexed for each pixel. The true image signal $S_S$ of each pixel creates a true image frame signal.

In one embodiment, the look up table 1500 may use frame numbers 1510 and the measured reference image frame signals 1520 to index pre-calculated excess signals $S_{PRE}$ 1530. The frame numbers 1510 may correspond to the frame times $T_{ref1}$ 1230, $T_{ref1}$ 1330, $T_{ref1}$ 1430, and $T_{ref1}$ 1431 of FIGS. 12, 13, and 14. The measured reference image frame signals 1520 may correspond to the measured signal levels $L_{D1}$ 1241, $L_{D1}$ 1361, $L_{D1}$ 1481, and $L_{D2}$ 1491 of the selected reference image frames 1240, 1340, 1440, and 1441, respectively. Pre-calculated excess signals $S_{PRE}$ 1530, in one embodiment, may be pre-calculated estimations of the excess signal $S_E$ 235 using the integration function of FIG. 4. In another embodiment, the pre-calculated excess signals $S_{PRE}$ 1530 may be pre-calculated using the power function. In another embodiment, the pre-calculated excess signals $S_{PRE}$ 1530 may be pre-calculated by testing the behavior of the sensor array through a non-linear range of operation. In another embodiment, the pre-calculated excess signals $S_{PRE}$ 1530 may be determined by simulating the behavior of a sensor array through a non-linear range of operation. In another embodiment, the pre-calculated excess signals $S_{PRE}$ 1530 may be determined by theorizing the behavior of sensor array through a non-linear range of operation. The pre-calculated excess signals $S_{PRE}$ 1530 may then be subtracted from the measured signal $S_T$ 236 of an image frame to compensate for the excess signal $S_E$ 235 present in the measured signal $S_T$ 236.

In another embodiment, a recursive function may be used in estimating the excess signal $S_E$ 235. The following description and equations are used as one method of estimating the excess signal $S_E$ 235 using a recursive function. The recursive function estimates the excess signal $S_E$ 235 of a frame (N) to be corrected using the calculated excess signal $S_E$ 235 of the previous frame (N−1) and a coefficient α, which is recalculated for every consecutive frame to be corrected. The coefficient α for the first frame to be corrected is determined using the measured signal $S_T$ 236 of the two previous consecutive reference frames. After estimating the excess signal $S_E$ 235 using the recursive function, the excess signal $S_E$ 235 may be subtracted from the measured signal $S_T$ 236 of the frame to produce a corrected true image signal without any "ghost" images that may be introduced by previous radiographic image frames.

$$S_{EN} = S_{EN-1} \cdot \alpha_N \quad (19)$$

$$\alpha_N = \alpha_{N-1} + Kp \cdot (1 - \alpha_{N-1})^2 \quad (20)$$

One example of the recursive function approximation is shown in equations (19) and (20). The recursive function in equation (19) calculates the excess signal $S_{EN}$ of the lag frame N by multiplying the excess signal $S_{EN-1}$ of the previous lag frame N−1 by a coefficient $\alpha_N$. Coefficient $\alpha_N$ is calculated in equation (20) using a constant Kp and the coefficient of the previous frame $\alpha_{N-1}$. Constant Kp is dependent on the attributes of the imager sensor array 16 and, in one embodiment, may be in the range of 0.5 to 1.1. Coefficient $\alpha_N$ is calculated for every new frame.

Figure 16A:
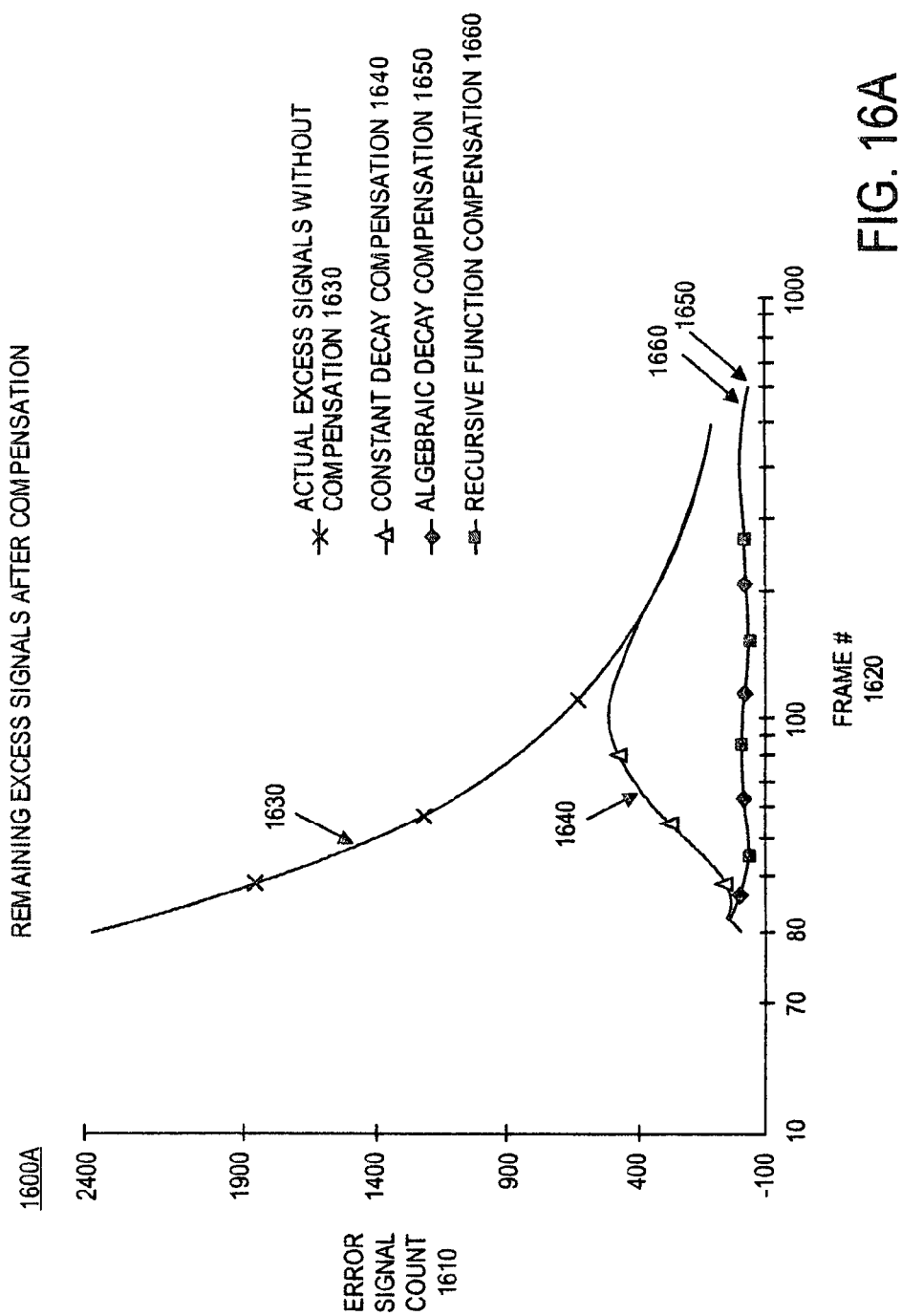
FIG. 16A illustrates one example of a graph showing the remaining excess signal after compensation using different estimation methods.
Figure 16B:
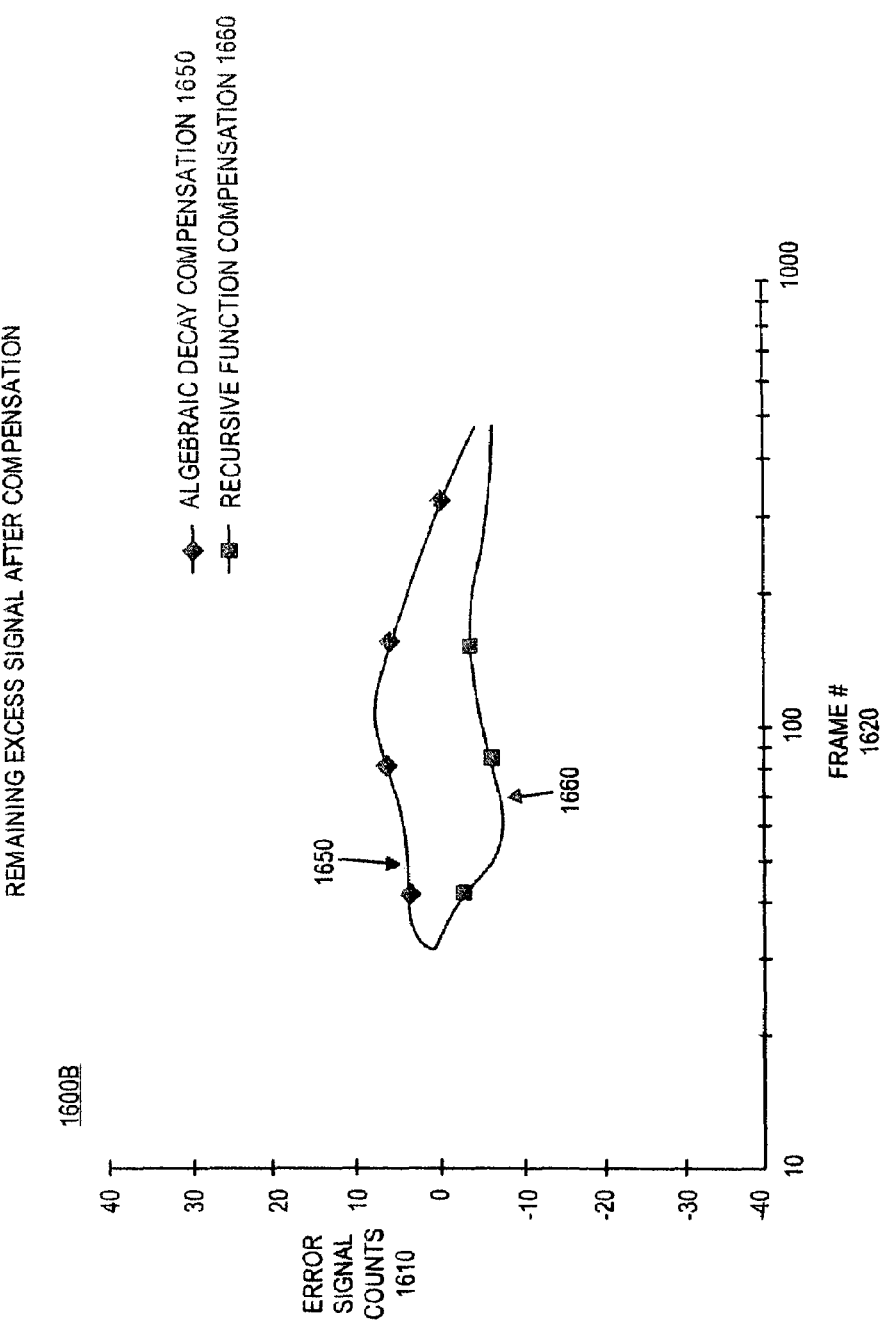
FIG. 16B illustrates one example of a graph showing the remaining excess signal after compensation of two estimation methods at a smaller scale than FIG. 16A.

FIG. 16A illustrates one example of a graph showing the remaining excess signal $S_E$ 235 of an image after compensation using three different estimation functions as a function of frame number. The error signal count 1610 resulting from the estimation methods 1640, 1650, and 1660, illustrated in FIGS. 16A and 16B, are examples of the estimations made in the steps 720, 830, and 930 of the methods described in FIGS. 7, 8, and 9, respectively. The graph 1600a includes the error signal count 1610 of the actual measured signal $S_T$ 236 of an image 1630 without compensation for the excess signal $S_E$ 235. The graph 1600a also includes the error signal count 1610 of the remaining excess signal $S_E$ 235 after compensation using three different estimation methods as a function of frame number 1620. The three estimation methods are a constant decay function 1640, a power function 1650, and a recursive function 1660.

FIG. 16B illustrates the same remaining excess signal $S_E$ 235 for two of the estimation methods as a function of frame number at a smaller scale than FIG. 16A. Graph 1600b illustrates the error signal counts 1610 of the power function 1650, and the recursive function 1660. The actual excess signal $S_E$ without compensation 1630, and the constant decay function 1640 are not shown in graph 1600b because they are outside the scale of the graph. In mixed radiographic/fluoroscopy applications, lower dose fluoroscopy images are acquired shortly after a higher dose radiographic exposure. The remaining excess signal from the radiographic exposure may appear as a "ghost" image in the fluoroscopic images. If the error count of the remaining excess signal $S_E$ 235 after compensation can be lowered the "ghost" appearing in the images can be corrected. The error counts illustrated in FIG. 16B correspond to an x-ray dose of approx. 0.5 uR/frame, which is about half of the minimum dose recommended for the fluoroscopy mode of imager sensor array 16. An estimation of excess signal method that permits the error signal count 1610 to be below 400 error counts after compensation may reduce or correct any "ghost" images that may be present in subsequent fluoroscopic images that are introduced from previous radiographic exposures. Compensation using the estimation method of constant decay 1640 of FIG. 16A may not sufficiently compensate for the excess signal because the levels of the error signal count 1610 have a maximum absolute magnitude above 400-error count. The remaining excess signal after compensation using the power function 1650 and the recursive function 1660 have maximum absolute magnitudes lower than 10 counts. The power function 1650 and the recursive function 1660 having an error signal count lower than 10 may sufficiently reduce or correct any "ghost" images that may be present due to excess signal $S_E$ 235.

The particular methods of the invention have been described in terms of computer software with reference to a series of flowcharts. The methods to be performed by computing device 4 constitute computer programs made up of computer-executable instructions illustrated as blocks (acts). Describing the methods by reference to a flowchart enables one skilled in the art to develop such programs including such instructions to carry out the methods on suitably configured computers (the processing unit of the computer executing the instructions from computer-readable media). The computer-executable instructions may be written in a computer programming language or may be embodied in programmable or discrete logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result. It will be appreciated that more or fewer processes may be incorporated into the methods as described above without departing from the scope of the invention, and that no particular order is implied by the arrangement of blocks shown and described herein.

In the foregoing specification, the invention is described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   estimating an excess signal based on a non-linear time variant decay response model, wherein the model comprises a representation of a measured signal of an image frame that compensates for changes over time of the measured signal of the image frame; and
   compensating for the excess signal in the image frame of an imaging system.

2. The method of claim 1, wherein the excess signal changes over time and compensating for the excess signal in the imaging system is based on a frame rate.

3. The method of claim 1, wherein estimating the excess signal further comprises selecting a first reference image frame; and wherein the excess signal is estimated using a measured signal of the first reference image frame and a difference in time between a frame time of the first reference image frame and an end of exposure time of a radiographic image, the first measured signal value corresponds to the measured signal at the frame time of the first reference image frame.

4. The method of claim 1, wherein estimating the excess signal further comprises calculating the excess signal as a function of an integration time.

5. The method of claim 1, wherein estimating the excess signal further comprises calculating the excess signal using a power function.

6. The method of claim 5, wherein the power function comprises:
   calculating a coefficient using the measured signal of the first reference image frame and the difference in time between the frame time of the first reference image frame and the end of exposure time of the radiographic image; and
   calculating the excess signal using the coefficient and a frame time of a non-saturated image frame.

7. The method of claim 1, wherein estimating the excess signal further comprises selecting the excess signal from a look-up table.

8. The method of claim 7, wherein the look-up table comprises:
   a plurality of frame times;
   a plurality of measured signals, the plurality of measured signals corresponding to the plurality of frame times; and
   a plurality of pre-calculated excess signals, the plurality of pre-calculated excess signals corresponding to the plurality of frame times and the plurality of measured signals.

9. The method of claim 1, wherein estimating the excess signal further comprises selecting a first reference image frame; wherein estimating the excess signal further comprises selecting a second reference image frame; wherein the second reference image frame is an exposed image frame; and wherein the exposed image frame is a non-saturated exposed image frame.

10. The method of claim 1, wherein estimating the excess signal further comprises calculating the excess signal of a next frame using a recursive function.

11. The method of claim 10, wherein the recursive function comprises:
    calculating a first coefficient using the measured signal of the first reference image frame and the measured signal of the second reference image;
    calculating a second coefficient using the first coefficient; and
    calculating the excess signal of the next frame using the second coefficient and at least one of the measured signal of the first reference image signal or the measured signal of the second reference image signal.

12. A method, comprising:
    estimating an excess signal that changes over time based on a non-linear decay response model that comprises a representation of a measured signal of an image frame, wherein the non-linear decay response model representation compensates for changes over time in the measured signal; and
    compensating for the excess signal in the image frame of an imaging system.

13. The method of claim 12, wherein the estimation of the excess signal is derived by integrating as a function of time, a smooth curve fit to experimentally derived excess signal data.

14. An apparatus, comprising:
    an imager; and
    a processor coupled with the imager and configured to compensate for an excess signal in the imager based on a non-linear time variant decay response model, wherein the model comprises a representation of a measured signal of an image frame and a frame rate.

15. The apparatus of claim 14, wherein the processor is configured to cause the compensation by subtracting an estimation of the excess signal based on the frame rate.

16. The apparatus of claim 14, wherein the processor is configured to estimate the excess signal over an integration time.

17. The apparatus of claim 14, wherein the processor is configured to estimate the excess signal using a power function.

18. The apparatus of claim 14, wherein the processor is configured to estimate the excess signal using a look-up table.

19. The apparatus of claim 14, wherein the processor is configured to estimate the excess signal using a recursive function.

20. The apparatus of claim 14, wherein the integration time is the reciprocal of the frame rate.

* * * * *